(12) United States Patent
Yeung

(10) Patent No.: US 7,716,087 B1
(45) Date of Patent: *May 11, 2010

(54) METHODS AND SYSTEM OF CONDUCTING BUSINESS-TO-BUSINESS OPERATIONS BY REGISTERED SELLERS AND BUYERS USING AN INTERNET ACCESSIBLE PLATFORM

(76) Inventor: Yung Yeung, 385 Old Ranch Rd., Bradbury, CA (US) 91008

( * ) Notice: Subject to any disclaimer, the term of this patent is extended or adjusted under 35 U.S.C. 154(b) by 0 days.

This patent is subject to a terminal disclaimer.

(21) Appl. No.: 12/478,108

(22) Filed: Jun. 4, 2009

(51) Int. Cl.
*G06Q 30/00* (2006.01)

(52) U.S. Cl. .............................. 705/26; 705/1; 705/27; 705/36; 705/37; 705/36 R; 705/80

(58) Field of Classification Search ..................... 705/1, 705/26, 27, 35, 36 R, 37, 80
See application file for complete search history.

(56) References Cited

U.S. PATENT DOCUMENTS

| | | | |
|---|---|---|---|
| 5,765,141 A | 6/1998 | Spector | |
| 5,862,223 A | 1/1999 | Walker et al. | |
| 6,236,972 B1 | 5/2001 | Shkedy | |
| 6,980,962 B1 | 12/2005 | Arganbright et al. | |
| 7,124,107 B1* | 10/2006 | Pishevar et al. | 705/37 |
| 7,228,286 B1 | 6/2007 | Gamble, III | |
| 7,249,099 B2 | 7/2007 | Ling | |
| 7,340,433 B1 | 3/2008 | Kay et al. | |
| 7,349,877 B2 | 3/2008 | Ballow et al. | |
| 7,359,871 B1 | 4/2008 | Paasche et al. | |
| 7,359,879 B1 | 4/2008 | Braig et al. | |
| 7,363,272 B1 | 4/2008 | Braig et al. | |
| 7,523,045 B1 | 4/2009 | Walker et al. | |
| 2002/0042742 A1 | 4/2002 | Glover et al. | |
| 2002/0138399 A1 | 9/2002 | Hayes et al. | |
| 2003/0050884 A1 | 3/2003 | Barnett | |
| 2003/0130941 A1* | 7/2003 | Birle et al. | 705/40 |
| 2003/0144912 A1* | 7/2003 | McGee | 705/26 |
| 2003/0158809 A1 | 8/2003 | Carney et al. | |

(Continued)

FOREIGN PATENT DOCUMENTS

JP     2001117999 A     4/2001

(Continued)

OTHER PUBLICATIONS

Butler, David Bryan, "A Dictionary of Finance and Banking," Oxford University Press, 1997, 378 pgs.

*Primary Examiner*—Yogesh C Garg
(74) *Attorney, Agent, or Firm*—Morris, Manning & Martin LLP; Tim Tingkang Xia

(57) ABSTRACT

A method for using an internet accessible computer system to conduct business to business operations among a plurality of buyer companies and a plurality of seller companies. In one embodiment, the method includes the steps of registering each of the plurality of seller companies with an internet accessible computer system, wherein each of the plurality of seller companies sells goods to a corresponding one of the plurality of buyer companies, and the corresponding one buyer company makes payment for the goods sold by that seller company; and registering each of the plurality of buyer companies with the internet accessible computer system, wherein the registration of each of the plurality of buyer companies depends on the registration of its corresponding seller company.

1 Claim, 14 Drawing Sheets

U.S. PATENT DOCUMENTS

| | | |
|---|---|---|
| 2003/0236738 A1 | 12/2003 | Lange et al. |
| 2004/0024676 A1 | 2/2004 | Jones et al. |
| 2004/0111358 A1 | 6/2004 | Lange et al. |
| 2005/0131785 A1 | 6/2005 | Yap |
| 2005/0234800 A1 | 10/2005 | Khusial et al. |
| 2006/0155629 A1* | 7/2006 | Srinivasan .................... 705/35 |
| 2006/0218069 A1 | 9/2006 | Aberman et al. |
| 2007/0174210 A1* | 7/2007 | Zajkowski et al. ........ 705/36 R |
| 2008/0120129 A1 | 5/2008 | Seubert et al. |
| 2009/0125387 A1 | 5/2009 | Mak et al. |
| 2009/0222384 A1* | 9/2009 | Rowan ........................ 705/80 |

FOREIGN PATENT DOCUMENTS

| | | |
|---|---|---|
| JP | 2004220248 A | 8/2004 |
| JP | 2008210224 A | 9/2008 |
| KR | 20010078937 A | 8/2001 |
| KR | 2010084536 A | 9/2001 |
| WO | 00/52552 | 9/2000 |
| WO | 00/52617 | 9/2000 |
| WO | 01/09782 A2 | 2/2001 |
| WO | 03/073236 A2 | 9/2003 |
| WO | 03/085491 A2 | 10/2003 |

* cited by examiner

TABLE I

| i = item | 0 | 1 | 2 | 3 | 4 | 5 | 6 | 7 | 8 | 9 | (L=) 10 |
|---|---|---|---|---|---|---|---|---|---|---|---|
| Year | 2009 | 2010 | 2011 | 2012 | 2013 | 2014 | 2015 | 2016 | 2017 | 2018 | 2019 |
| PAE | 0 | $300M | | | | | | | | | |
| $\Delta E_i$ | 0 | $300M | | | | | | | | | |
| $PE_i$ | 15 | 15 | 50 | 20 | 30 | 40 | 25 | 28 | 35 | 40 | 48 |
| $SP_i$ | | $45 | | | | | | | | | |
| $N_{cs}$ (shares) | | 66.67M | | | | | | | | | |
| $\alpha_i$ | | .20 | .15 | .10 | .10 | .10 | .10 | .10 | .05 | .05 | .05 |
| $N_{cs} \times \alpha_i$ | | 13.33M | 10.00M | 6.67M | 6.67M | 6.67M | 6.67M | 6.67M | 3.34M | 3.34M | 3.34M |
| $\sum_{k=1}^{i} \Delta E_k / SP_k$ | 0 | 13.33M | | | | | | | | | |
| $N_{rs}^i$ | 0 | 13.33M | | | | | | | | | |
| $N_t$ | 100M | 113.33M | | | | | | | | | |

FIG. 13

TABLE II

| i = item | 0 | 1 | 2 | 3 | 4 | 5 | 6 | 7 | 8 | 9 | (L=) 10 |
|---|---|---|---|---|---|---|---|---|---|---|---|
| Year | 2009 | 2010 | 2011 | 2012 | 2013 | 2014 | 2015 | 2016 | 2017 | 2018 | 2019 |
| $a_i$ | | .20 | .15 | .10 | .10 | .10 | .10 | .10 | .05 | .05 | .05 |
| $a_t$ | | .10 | .10 | .10 | .10 | .10 | .10 | .10 | .10 | .10 | .10 |
| $a_t$ | | .2 | 0 | .2 | 0 | .2 | 0 | .2 | 0 | .2 | 0 |
| $a_t$ | | 0 | .2 | 0 | .2 | 0 | .2 | 0 | .2 | 0 | .2 |
| $a_i$ | | 0 | .3 | 0 | .2 | 0 | .1 | .1 | .1 | .1 | .1 |

FIG. 14

TABLE III

| i = item | 0 | 1 | 2 | 3 | 4 | 5 | 6 | 7 | 8 | 9 | (L=) 10 |
|---|---|---|---|---|---|---|---|---|---|---|---|
| Year | 2009 | 2010 | 2011 | 2012 | 2013 | 2014 | 2015 | 2016 | 2017 | 2018 | 2019 |
| $PAE/E_i$ ($M) | 0 | 300 | 600 | 1200 | 2400 | 4800 | 9600 | 19,200 | 38,400 | 76,800 | 153,600 |
| $\Delta E_i$ ($M) | 0 | 300 | 300 | 600 | 1200 | 2400 | 4800 | 9600 | 19,200 | 38,400 | 76,800 |
| $PE_i$ | 15 | 15 | 50 | 20 | 30 | 40 | 25 | 28 | 35 | 40 | 48 |
| $SP_i$ | | $45 | $265 | ... | ... | ... | ... | ... | ... | ... | ... |
| $N_{cs}$ (shares) | | 66.67M | 66.67M | ... | ... | ... | ... | ... | ... | ... | ... |
| $\alpha_i$ | | .20 | .15 | .10 | .10 | .10 | .10 | .10 | .05 | .05 | .05 |
| $\sum_{k=1}^{i} N_{cs}(k)\, \alpha_{i+1-k}$ | | 13.33M | 14.53M | ... | ... | ... | ... | ... | ... | ... | ... |
| $C_0 \sum_{k=1}^{i} \Delta E_k / SP_i$ | 0 | 13.33M | 4.52M | ... | ... | ... | ... | ... | ... | ... | ... |
| $N_{rs}^i$ | 0 | 13.33M | 4.52M | ... | ... | ... | ... | ... | ... | ... | ... |
| $N_t$ | 100M | 113.33M | 117.85M | ... | ... | ... | ... | ... | ... | ... | ... |

FIG. 15

METHODS AND SYSTEM OF CONDUCTING BUSINESS-TO-BUSINESS OPERATIONS BY REGISTERED SELLERS AND BUYERS USING AN INTERNET ACCESSIBLE PLATFORM

CROSS-REFERENCE TO RELATED PATENT APPLICATION

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to an internet accessible computer system to conduct business to business operations, in particular, to an internet accessible computer system to conduct business to business operations among a plurality of buyer companies and a plurality of seller companies and securitizing the operating profits of the plurality of seller companies.

BACKGROUND OF THE INVENTION

It is known that internet has facilitated business-to-business (or "B2B") markets, for instance, those in which business transactions may be negotiated and agreed electronically. Computers and their operations provide a significant part of the infrastructure of a B2B marketplace, and facilitate business transactions in those markets with efficiencies previously unforeseen.

The development of internet and associated B2B markets has in particular benefited small and medium enterprises (SMEs). As shown in FIG. 1, where a traditional way 100 of a business operation between a seller or supply company A (12) and a buyer company B (14) before the emergency of the B2B markets is illustrated. In a business transaction 11, the seller or supply company A (12) sells and delivers goods valued at, e.g. $1M, to the buyer company B (14) perhaps after a long negotiation between the two parties. In return, in a separate process 13, the buyer company B (14) then makes a payment for the value of the goods, here $1M, to the seller or supply company A (12) in cash or cash equivalents such as a check.

FIG. 2 illustrates a business transaction 200 between a seller or supply company A (22) and a buyer company B (24) with the help of current B2B markets. Seller or supply company A (22) releases information about its products at step 27 to an e-commerce platform 26, such as Google®, Yahoo®, or eBay®, which can be found and got by anyone who logons to the platform 26 such as buyer company B (24) at step 29. Seller or company A (22) and buyer company B (24) can negotiate and reach an agreement electronically through the platform 26. Then goods values at, e.g. $1M, is delivered to the buyer company B (24) at step 21. In return, in a separate process 23, the buyer company B (24) then makes a payment for the value of the goods, here $1M, to the seller or supply company A (22) in cash or cash equivalents such as a check or a wire transfer. Normally buyer company B (24) or seller company A (22) or both would pay a commission to the platform 26 at step 25. Both buyer company B (24) and seller company A (22) may also pay a membership or subscription fee to the platform 26 as well.

In other words, platform 26 is more or less functioning as an open information exchange platform. While it is true that users including SMEs have benefited tremendously from the information flow and efficiency offered by such "open" e-platforms, it may cause the unnecessary disclosure of trading information including the product price, the buyer's information, the trading scale, to unwanted third parties. For instance, the disclosure of the price information for products might cause unwanted competition between the platform members, which will counteract the positive effect brought by the B2B platform. More specifically, for instance, most B2B e-commerce platforms take an "open platform" approach, which allows SMEs (or any user) to register and compete for businesses when they pay for the standard membership or transaction fees. The openness of the Internet allows SMEs to market their products and attract new customers. In general it works as followed:

Step 1: suppliers register on an e-commerce platform and post the product information, such as product name, specification and price thereon;

Step 2: buyers log on to the e-commerce platform and search for wanted products;

Step 3: buyers find desired products and make an offer; and

Step 4: suppliers who offer the lowest prices often win the deal.

Due to the openness nature of the Internet, the online marketplace features many-to-many relationships. Since suppliers have to reveal their product prices or other trade secrets on the Internet, this approach, while allowing suppliers to expose their products to almost unlimited number of potential buyers, has some negative impacts on SMEs such as 1. Pressing the profit margin of suppliers: To attract the eyeballs of buyers, suppliers are forced to lower product prices on the Internet. Therefore, to openly compete for each and every order, suppliers have to scarify their profit margin;

2. Affecting the loyalty of customers to suppliers: All suppliers for the same kind of products post their products on the Internet, so potential buyers will be able to view product information from different competitors, and pick products from one supplier who offers lowest prices, not necessarily from the supplier(s) who has an existing relationship with the customer(s); and 3. Losing the competitive advantages: Posting some of the detailed and sensitive product description on the Internet can lead to losing the competitive advantages for suppliers.

Another obstacle for the development and operation of SMEs is, despite the vital role played by SMEs in economy, that it has been very difficult for SMEs to access capital. For examples, both regulatory barriers and large expenses associated with stock listings make it quite difficult, if not impossible, for a vast majority of SMEs to access capital in the capital markets through public offering. Moreover, many SMEs do not have a long enough history or successful track record that can be relied on by banks or potential investors in making loan decisions, which further limits the ability of SMEs to access capitals using loan as a vehicle. Furthermore, it does not help that many SMEs do not have sophisticated financial reports.

Also, in recent years, companies have obtained financing by engaging in "securitization" transactions in which the company (or, more typically, a bankruptcy-remote special purpose vehicle) issues debt instruments backed by an asset or pool of assets in which the principal and interest is paid from the cash flow generated by the assets. In most securitizations, the transaction is structured to exclude the credit risk of the sponsor of the transaction so that the credit worthiness of the debt instruments issued in the securitization depends primarily on the credit risk inherent in the underlying financial assets. Once the extent of such credit risk has been quantified, typically by a rating agency, a form of credit and liquidity support can be supplied to cover the risk, permitting the securities issued in the transaction to be highly rated, even in cases where the sponsor of the transaction is not rated or is a poor credit risk. The levels of credit support and liquidity required in a securitization may be a function of the requirements set by the rating agencies based on their analysis of the quality of the underlying assets and the structure of the securities in light of the probable rates of default and recovery on the underlying assets. Because traditional general obligation debt is backed by the credit of the entire operating company, and the operating company is subject to a wide range of risks in the market place, an operating company seeking to issue highly-rated general obligations may be required to maintain relatively higher levels of capital and liquidity than in a securitization transaction in which the risk can be segregated to the performance of particular assets.

Securitization transactions include "cash flow" or "market value" transactions. In a "cash flow" securitization, the securities issued in the transaction are paid from roughly matching payments expected to be received on the underlying assets. In "market value" securitizations, the ability to repay the securities depends on the sufficiency of, and ability to realize upon, the value of the underlying assets. For example, in a typical "market value" transaction, the initial offering raises enough cash to pay coupon payments, and the final terminating payment is financed by selling the assets to third parties.

However, one way or another, these types of securitization transactions based on the value of the underlying assets. When the value of the underlying assets, which has inherent risks associated with overall economy doubtable if the integrity of the rating agency is not reliable, plunges, the values of these securitization transactions would also crush, and even worse, these securities may find ways to "poison" other related assets. The sub-mortgage crisis is a livid example.

Therefore, a heretofore unaddressed need exists in the art to address the aforementioned deficiencies and inadequacies.

SUMMARY OF THE INVENTION

The present invention, in one aspect, relates to a method for using an internet accessible computer system to conduct business to business operations among a plurality of buyer companies and a plurality of seller companies. In one embodiment, the method includes the steps of registering each of the plurality of seller companies with an internet accessible computer system, wherein each of the plurality of seller companies sells goods to a corresponding one of the plurality of buyer companies, and the corresponding one buyer company makes payment for the goods sold by that seller company, and registering each of the plurality of buyer companies with the internet accessible computer system, wherein the registration of each of the plurality of buyer companies depends on the registration of its corresponding seller company.

The method further includes the step of issuing by a business entity in control of the internet accessible computer system at the beginning of a fiscal year, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$ according to the following formula:

$$N_{cs}=(PAE \times L)/SP_0,$$

wherein the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$.

Moreover, the method includes the steps of receiving cash or cash equivalents payments by the business entity from the plurality of buyer companies, wherein the cash or cash equivalents payment are made by the plurality of buyer companies for goods sold by the plurality of corresponding seller companies to the plurality of buyer companies, respectively;

making book entries on a computer server for the cash or cash equivalents payments received and storing corresponding records of the book entries in a database coupled with the computer server;

aggregating in every fiscal year over the period of time T by the computer server all the cash or cash equivalents payments received from the plurality of buyer companies into a first amount, $\{M_{1i}, i=1, \ldots, L\}$;

making cash or cash equivalents payments by the business entity to the plurality of seller companies aggregated in a second amount, $\{M_{2i}, i=1, \ldots, L\}$, in every fiscal year over the period of time T, wherein $M_{1i}$ and $M_{2i}$ satisfy the following relationships:

$$M_{2i}<M_{1i}, \text{ and}$$

$$(M_{1i}-M_{2i}) \times (1-R_{tax})=E_i,$$

wherein $E_i$ is the after-tax earning that the plurality of seller companies would make from the sales of the goods to the plurality of corresponding buyer companies over the ith fiscal year; and making book entries on the computer server for all the cash or cash equivalents payments made and storing corresponding records of the book entries in the database coupled with the computer server.

The method additionally includes the steps of retaining $\{E_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating by the computer server a maximum number $N_{rs}$, which is determined by the following formula:

$$N_{rs}=\Sigma^L_{i=1}N_{cs}(i) \times \alpha_i,$$

where $\{\alpha_i\}$ satisfy the condition of $\Sigma^L_{i=1}\alpha_i \leq 1$, and the number of ordinary shares of the business entity over the period of time T converted from $N_{cs}$ convertible preference shares issued to the plurality of seller companies is no greater than the maximum number $N_{rs}$;

calculating by the computer server the earning growth, $\Delta E_i$, of the ith year from the immediate prior year, the (i−1)th year, by the following formula:

$$\Delta E_i=E_i-E_{i-1};$$

calculating by the computer server a function $N^i_{rs}(\Delta E_i, SP_i)$ that satisfies the following conditions:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

wherein $SP_i$ is the market stock price per share for the ordinary shares of the business entity averaged over a predetermined time period around time of the ith year;

calculating by the computer server, $N^i_{rs}$, the total number of ordinary shares of the business entity converted for the ith year for the plurality of seller companies from the following relationship:

$$N^i_{rs} = \operatorname{Min}(N^i_{rs}(\Delta E_i, SP_i), \Sigma^i_{k=1} N_{cs}(k) \times \alpha_{i+1-k}); \text{ and}$$

delivering $N^i_{rs}$ ordinary shares of the business entity of the ith year to the plurality of seller companies.

In one embodiment, $N^i_{rs}(\Delta E_i, SP_i)$ is in the form of $$N^i_{rs}(\Delta E_i, SP_i) = C_0[\Sigma^i_{k=1} \Delta E_k/SP_i],$$

wherein $C_0$ is a predetermined constant, and $N^i_{rs}$ is calculated from the following relationship:

$$N^i_{rs} = \operatorname{Min}(C_0[\Sigma^i_{k=1} \Delta E_k/SP_i], \Sigma^i_{k=1} N_{cs}(k) \times \alpha_{i+1-k}).$$

In practicing the method as set forth above, no number $N_{cs}$ of convertible preference shares is issued to the plurality of seller companies at the time of the ith year if $\Delta E_i$ is smaller than zero. Furthermore, no number $N^i_{rs}$ of convertible preference shares is converted to ordinary shares of the business entity at the ith year by the plurality of seller companies if $E_i$ is below a predetermined threshold. The rights and interests to the not converted $N0^i_{cs}$ number of ordinary shares of the business entity at the ith year by the plurality of seller companies, which satisfies the following relationship:

$$N0^i_{cs} = \Sigma^i_{k=1} N_{cs}(k) \times \alpha_{i+1-k} - C_0[\Sigma^i_{k=1} \Delta E_k/SP_i],$$

are forfeited by the plurality of seller companies.

The number $N^i_{rs}$ of convertible preference shares is delivered to the plurality of seller companies according to their contributions to the after-tax earnings $E_1, E_2, \ldots E_i$, respectively.

The present invention, in another aspect, relates to an internet accessible computer system to conduct business to business operations among a plurality of buyer companies and a plurality of seller companies. In one embodiment, the system includes at least one buyer client system; at least one computer server coupled to a database for storing data; and a network connecting said at least one seller client system and said at least one buyer client system to said at least one computer server, wherein said at least one computer server is programmed for:

registering each of the plurality of seller companies with the internet accessible computer system, wherein each of the plurality of seller companies sells goods to a corresponding one of the plurality of buyer companies, and the corresponding one buyer company makes payment for the goods sold by that seller company;

registering each of the plurality of buyer companies with the internet accessible computer system, wherein the registration of each of the plurality of buyer companies depends on the registration of its corresponding seller company;

when a business entity in control of the internet accessible computer system issues, at the beginning of a fiscal year, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$, calculating the number $N_{cs}$ according to the following formula:

$$N_{cs} = (PAE \times L)/SP_0,$$

wherein the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$;

when cash or cash equivalents payments are received by the business entity from the plurality of buyer companies, wherein the cash or cash equivalents payment are made by the plurality of buyer companies for goods sold by the plurality of corresponding seller companies to the plurality of buyer companies, respectively, making book entries on the computer server for all the cash or cash equivalents payments received and storing corresponding records of the book entries in the database;

aggregating in every fiscal year over the period of time T by the computer server all the cash or cash equivalents payments received from the plurality of buyer companies into a first amount, $\{M_{1i}, i=1, \ldots, L\}$;

calculating $E_i$, the after-tax earning that the plurality of seller companies would make from the sales of the goods to the plurality of corresponding buyer companies at the ith fiscal year;

when cash or cash equivalents payments by the business entity are made to the plurality of seller companies, aggregating all the cash or cash equivalents payments made in a second amount, $\{M_{2i}, i=1, \ldots, L\}$, in every fiscal year over the period of time T, wherein $M_{1i}$ and $M_{2i}$ satisfy the following relationships:

$M_{2i} < M_{1i}$, and $(M_{1i} - M_{2i}) \times (1 - R_{tax}) = E_i;$ making book entries on the computer server for all the cash or cash equivalents payments made and storing corresponding records of the book entries in the database;

retaining $\{E_i, i=1, \ldots, L\}$ as the cash flow for the business entity to back the ordinary shares of the business entity publicly traded in the capital market; making book entries on the computer server for all the cash flow retained and storing corresponding records of the book entries in the database;

calculating a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1} \alpha_i \leq 1$, and the number of ordinary shares of the business entity over the period of time T converted from $N_{cs}$ convertible preference shares issued to the plurality of seller companies is no greater than the maximum number $N_{rs}$;

calculating the earning growth, $\Delta E_i$, of the ith year from the immediate prior year, the (i−1)th year, by the following formula:

$\Delta E_i = E_i - E_{i-1};$ calculating by the computer server a function $N^i_{rs}(\Delta E_i, SP_i)$ that satisfies the following conditions:

$\partial N^i_{rs}(\Delta E_i, SP_i)/\partial \Delta E_i \geq 0,$ and $\partial N^i_{rs}(\Delta E_i, SP_i)/\partial SP_i \leq 0,$ wherein $SP_i$ is the market stock price per share for the ordinary shares of the business entity averaged over a predetermined time period around time of the ith year;

calculating by the computer server, $N^i_{rs}$, the total number of ordinary shares of the business entity converted for the ith year for the plurality of seller companies from the following relationship:

$$N^i_{rs} = \text{Min}(N^i_{rs}(\Delta E_i, SP_i), \Sigma^i_{k=1} N_{cs}(k) \times \alpha_{i+1-k}); \text{ and}$$

when $N^i_{rs}$ ordinary shares of the business entity of the ith year are delivered to the plurality of seller companies, making book entries on the computer server for the delivered $N^i_{rs}$ ordinary shares of the business entity and storing corresponding records of the book entries in the database.

In one embodiment, $N^i_{rs}(\Delta E_i, SP_i)$ is in the form of $$N^i_{rs}(\Delta E_i, SP_i) = C_0 [\Sigma^i_{k=1} \Delta E_k / SP_i],$$

wherein $C_0$ is a predetermined constant, and said at least one computer server is programmed for calculating $N^i_{rs}$ from the following relationship:

$$N^i_{rs} = \text{Min}(C_0 [\Sigma^i_{k=1} \Delta E_k / SP_i], \Sigma^i_{k=1} N_{cs}(k) \times \alpha_{i+1-k}).$$

The present invention, in a further aspect, relates to a method for using an internet accessible computer system to conduct business to business operations among a plurality of buyer companies and a plurality of seller companies. In one embodiment, the method includes the steps of registering each of the plurality of seller companies with an internet accessible computer system, wherein each of the plurality of seller companies sells goods to a corresponding one of the plurality of buyer companies, and the corresponding one buyer company makes payment for the goods sold by that seller company; and registering each of the plurality of buyer companies with the internet accessible computer system, wherein the registration of each of the plurality of buyer companies depends on the registration of its corresponding seller company.

The method further includes the step of issuing by a business entity in control of the internet accessible computer system at the beginning of a first predetermined time period $t_1$, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$ according to the following formula:

$$N_{cs} = (PAE \times L) / SP_0,$$

wherein the ordinary shares of the business entity are publicly traded in a capital market, the period of time T is divided into a predetermined number L of the first predetermined time period $t_1$ such that $T = L \times t_1$, PAE is the projected annual after-tax earning that the plurality of seller companies would make from the sales of the goods to the plurality of buyer companies over the period of time T, and $SP_0$ is the stock price per share for the ordinary shares of the business entity averaged over a second predetermined time period $t_2$ around time $T_0$.

Moreover, the method includes the steps of receiving cash or cash equivalents payments by the business entity from the plurality of buyer companies, wherein the cash or cash equivalents payment are made by the plurality of buyer companies for goods sold by the plurality of corresponding seller companies to the plurality of buyer companies, respectively;

aggregating in every first predetermined time period $t_1$ over the period of time T by a computer server all the cash or cash equivalents payments received from the plurality of buyer companies into a first amount, $\{M_{1i}, i=1, \ldots, L\}$;

making cash or cash equivalents payments by the business entity to the plurality of seller companies aggregated in a second amount, $\{M_{2i}, i=1, \ldots, L\}$, in every first predetermined time period $t_1$ over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i,$$

wherein $E_i$ is the after-tax earning that the plurality of seller companies would make from the sales of the goods to the plurality of corresponding buyer companies over the ith first predetermined time period $t_1$; and converting a number of $N_{cs}$ convertible preference shares issued to the plurality of seller companies to a number of ordinary shares of the business entity over the period of time T no greater than a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1} \alpha_i \leq 1$.

The method further includes the steps of calculating by the computer server the earning growth, $\Delta E_i$, of the ith first predetermined time period $t_1$ from the immediate first predetermined time period $t_1$, the (i−1)th first predetermined time period $t_1$, by the following formula:

$$\Delta E_i = E_i - E_{i-1}; \text{ and}$$

completing the issuance and delivery of $N^i_{rs}$ ordinary shares of the business entity at the ith first predetermined time period $t_1$ to the plurality of seller companies according to a function $N^i_{rs}(\Delta E_i, SP_i)$ that satisfies the following conditions:

$$\partial N^i_{rs}(\Delta E_i, SP_i) / \partial \Delta E_i \geq 0, \text{ and}$$

$$\partial N^i_{rs}(\Delta E_i, SP_i) / \partial SP_i \leq 0,$$

wherein $SP_i$ is the market stock price per share for the ordinary shares of the business entity averaged over a predetermined time period around time of the ith first predetermined time period $t_1$, and $N^i_{rs}$ is the total number of ordinary shares of the business entity converted at the ith first predetermined time period $t_1$ by the plurality of seller companies.

In one embodiment, $N^i_{rs}(\Delta E_i, SP_i)$ is in the form of $$N^i_{rs}(\Delta E_i, SP_i) = C_0 [\Sigma^i_{k=1} \Delta E_k / SP_i],$$

wherein $C_0$ is a predetermined constant.

In one embodiment, the number $N^i_{rs}$ of convertible preference shares that is converted and delivered to the plurality of seller companies for the ith first predetermined time period $t_1$ is predetermined by the following relationship:

$$N^i_{rs} = \text{Min}(C_0 [\Sigma^i_{k=1} \Delta E_k / SP_i], \Sigma^i_{k=1} N_{cs}(k) \times \alpha_{i+1-k}).$$

In practicing the method as set forth above in this aspect of the present invention, in one embodiment, no number $N_{cs}$ of convertible preference shares is issued to the plurality of seller companies for the ith first predetermined time period $t_1$ if $\Delta E_i$ is smaller than zero. Moreover, no number $N^i_{rs}$ of convertible preference shares is converted to ordinary shares of the business entity for the ith first predetermined time period $t_1$ by the plurality of seller companies if $E_i$ is below a predetermined threshold. The rights and interests to the not converted $N0^i_{cs}$ number of ordinary shares of the business entity for the ith first predetermined time period $t_1$ by the plurality of seller companies, which satisfies the following relationship:

$$N0^i_{cs} = \Sigma^i_{k=1} N_{cs}(k) \times \alpha_{i+1-k} - C_0 [\Sigma^i_{k=1} \Delta E_k / SP_i],$$

are forfeited by the plurality of seller companies.

In one embodiment, the not converted $N0^i_{cs}$ number of ordinary shares of the business entity for the ith first predetermined time period $t_1$ by the plurality of seller companies is vested in a second business entity, wherein the second business entity is an intermediary between the business entity and the plurality of seller companies. The relationship of the second business entity and the business entity is defined by a first agreement, and the relationship of the second business entity and the plurality of seller companies is defined by a second agreement that has terms different than that of the first agreement.

The first predetermined time period $t_1$ is one of a year, a fiscal year, a half year, a half fiscal year, a quarter, a fiscal quarter, a month, and a fiscal month.

The number $N^i_{rs}$ of convertible preference shares is delivered to the plurality of seller companies according to their contributions to the after-tax earnings $E_1, E_2, \ldots E_i$, respectively.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 13 is a table illustrating various information associated with interactions among several parties according to one embodiment of the present invention.

FIG. 14 is a table illustrating various possible choices of parameters $\{\alpha_i\}$.

FIG. 15 is a table illustrating various information associated with interactions among several parties according to one embodiment of the present invention.

DETAILED DESCRIPTION OF THE INVENTION

Figure 1:
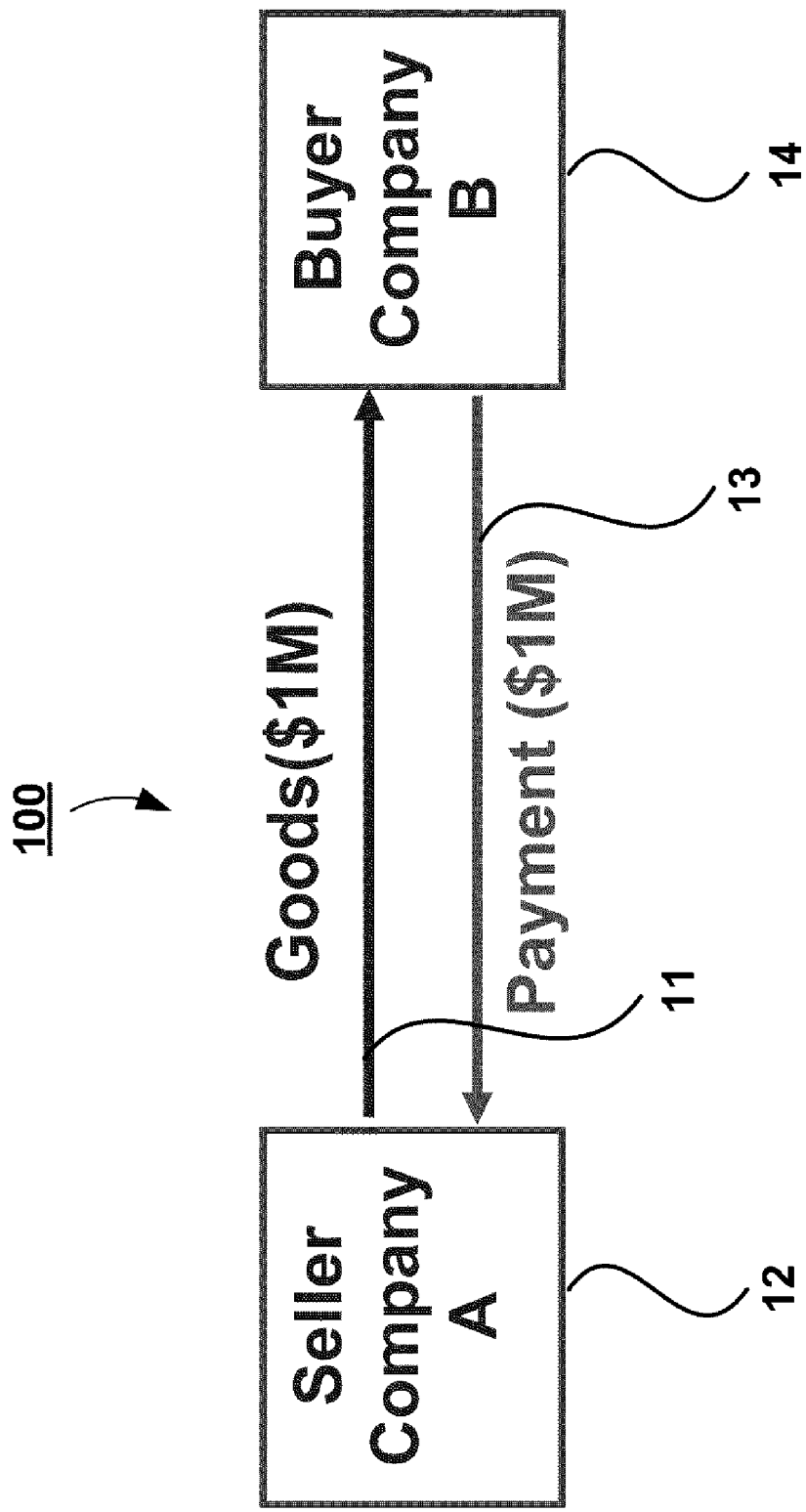
FIG. 1 is a block diagram of parties and cash flows in a traditional commercial transaction.
Figure 2:
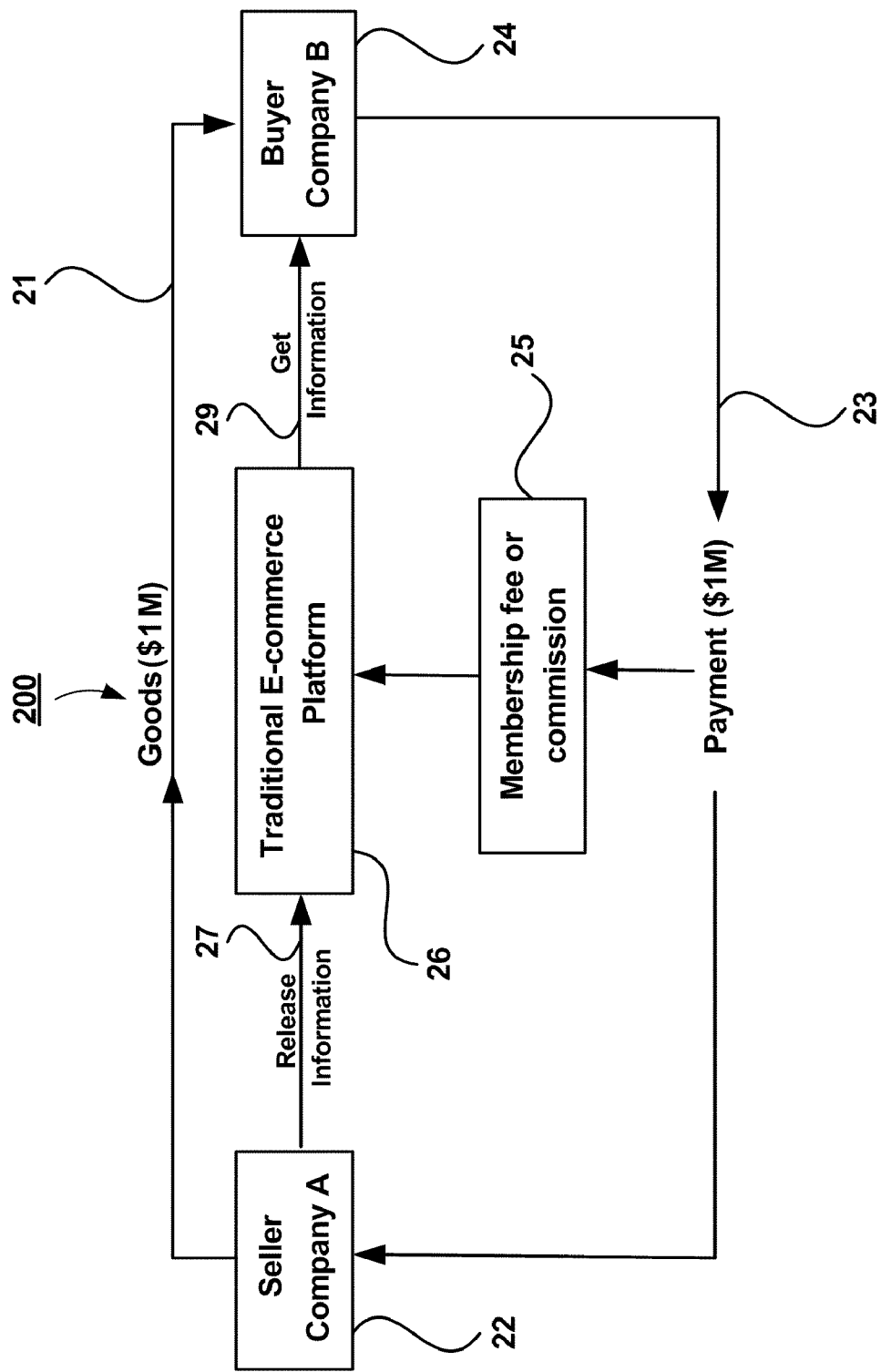
FIG. 2 is a block diagram of parties and cash flows in a commercial transaction conducted with help from an existing e-commerce platform.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

Overview of the Invention

Figure 3:
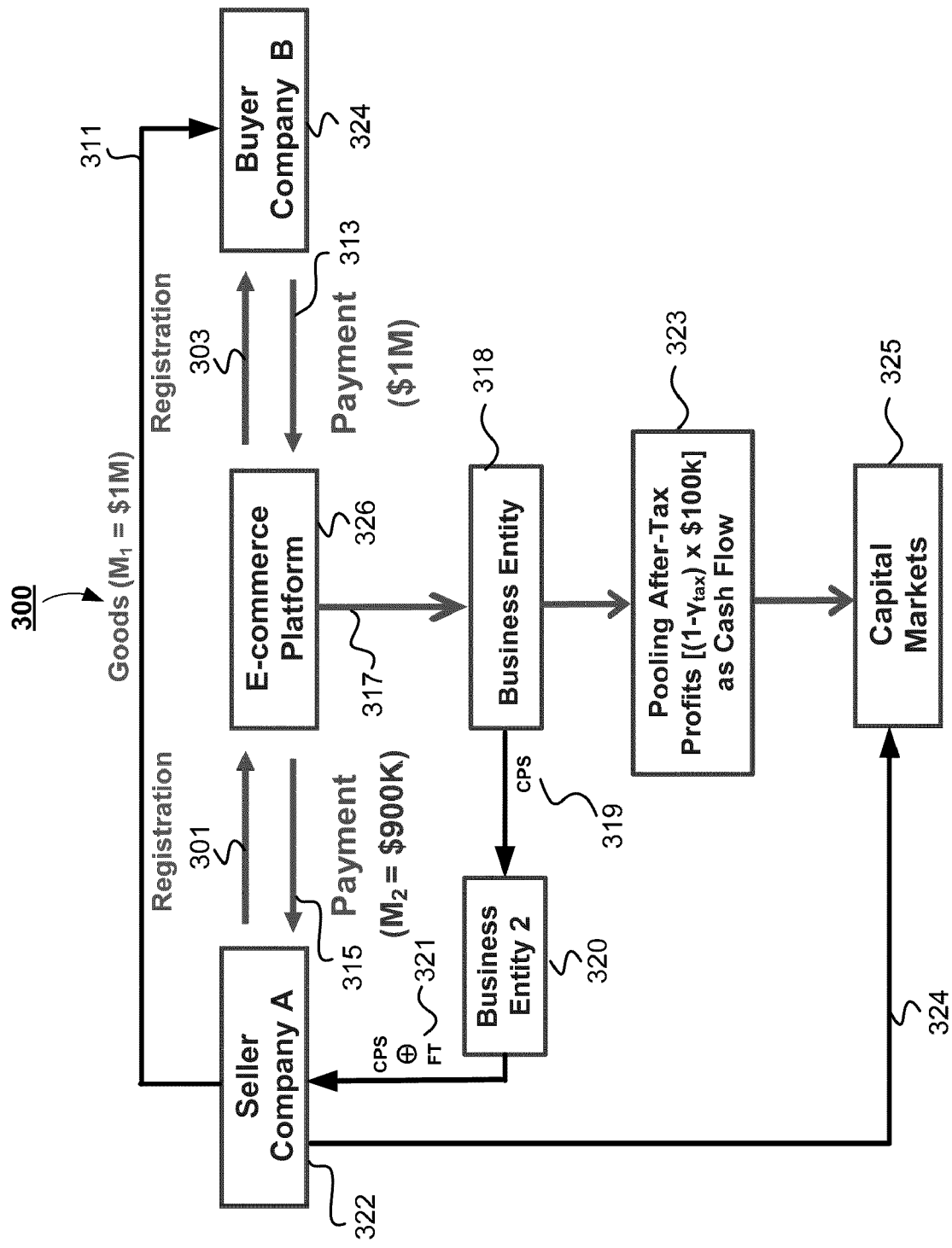
FIG. 3 is a block diagram of parties and cash flows in a commercial transaction with help from an inventive e-commerce platform according to one embodiment of the present invention.

Referring to FIG. 3 first, where a block diagram of parties and cash flows in a commercial transaction with help from an inventive e-commerce platform according to one embodiment of the present invention is shown, company or companies 322 are sellers of goods, and company or companies 324 are corresponding buyers in an internet-intermediated B2B marketplace through an e-commerce platform 326. In the example as shown in FIG. 3, seller company 322 registers with the e-commerce platform 326 in a procedure 301, and buyer company 324 registers with the e-commerce platform 326 in a procedure 303. Registration procedures 301, 303 are further discussed infra.

Seller company 322 and buyer company 324 utilize the e-commerce platform 326 to negotiate and agree upon a purchase of goods with certain value $M_1$, such as $1M, which amount is chosen purely arbitrarily for exemplary purpose only, by buyer company 324 from seller company 322. The purchases of goods by buyer company 324 and acceptance of the delivery of goods from seller company 322 create cash receivables, notes or other rights to corresponding payment in the amount of $M_1$, here $1M, that are owned by the seller company 322. Buyer company 324 makes a payment of $1M in the form of cash or cash equivalents such as check, web-check, wire transfer in procedure 313 to the e-commerce platform 326.

The e-commerce platform 326 divides the payment of $1M (=$M_1$) into two amounts $M_2$ and $(M_1-M_2)$, where $M_2$ is the costs of the goods, and $(M_1-M_2)$ is operating profits, which satisfies $M_2<M_1$. A payment in the amount of $M_2$ is made by the e-commerce platform 326 to seller company 322 in procedure 315, and the second amount $(M_1-M_2)$ of the payment $M_1$ is retained by business entity 318 in procedure 317, which controls the e-commerce platform 326. After tax is paid to proper authority, business entity 318 pools all after tax operating profits $\{(1-R_{tax})(M_1-M_2)\}$ together from seller company 322 (and other seller companies) as its cash flow in procedure 323, where $R_{tax}$ is the proper tax rate. For simplicity, it is assumed in the following description $R_{tax}=0$ unless it is specified otherwise. Thus, in this example where the goods valued at $M_1$=$1M, a payment in the amount of $M_2$=$900K is made by the e-commerce platform 326 to seller company 322, and the second amount $(M_1-M_2)$=$100K of the payment $M_1$=$1M is retained by business entity 318. Business entity 318 offers its common or ordinary shares to public capital markets 325, where the ordinary shares of business entity 318 are traded and backed by the cash flow 323.

In addition to making the payment in the amount of $M_2$ to seller company 322 through the e-commerce platform 326, business entity 318 also issues a number of convertible preferred shares to seller company 322 at procedure 31, which can be converted into a number of ordinary shares of business entity 318 according to certain rules, terms, formulas and procedures as further discussed infra. A second business entity 320 can be optionally utilized as an intermediary between business entity 318 and seller company or companies 322. In this embodiment, the second business entity 320 manages the issuing of convertible preferred shares ("cps") to seller company and converting a number of convertible preferred shares to a number of ordinary shares of business entity 318 to seller company with certain financial terms ("FT") in procedure 321.

With a numbers of ordinary shares of business entity 318 that are traded in the capital markets 325, seller company 322 may have immediate access to the capital markets 325 by selling, borrowing against, taking other alike financial transactions on the number of ordinary shares of business entity 318 at procedure 324, which may not only allow seller company 322 to have access to the capital markets 325 to support its growth and other needs, but also enjoy the potential returns by the capital markets 325 through the business entity 318 as such a business and financial vehicle.

Accordingly, business entity 318 with its inventive e-commerce platform 326 that is connected through the Internet to and accessible by the participated buyers and sellers may provide business operation and management for these SMEs at to-date unseen efficiencies, as well as acting as a connecting channel between the marketplace and the capital markets. Business entity 318 with its inventive e-commerce platform 326 may provide access to securitization as a financing vehicle, further enhancing the access to credit and the capital markets by these SMEs.

Various unique features of the present invention will be made as to the embodiments of the present invention in conjunction with the accompanying drawings in FIGS. 1-15.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Registration with the Internet Accessible Computer System

Figure 4:
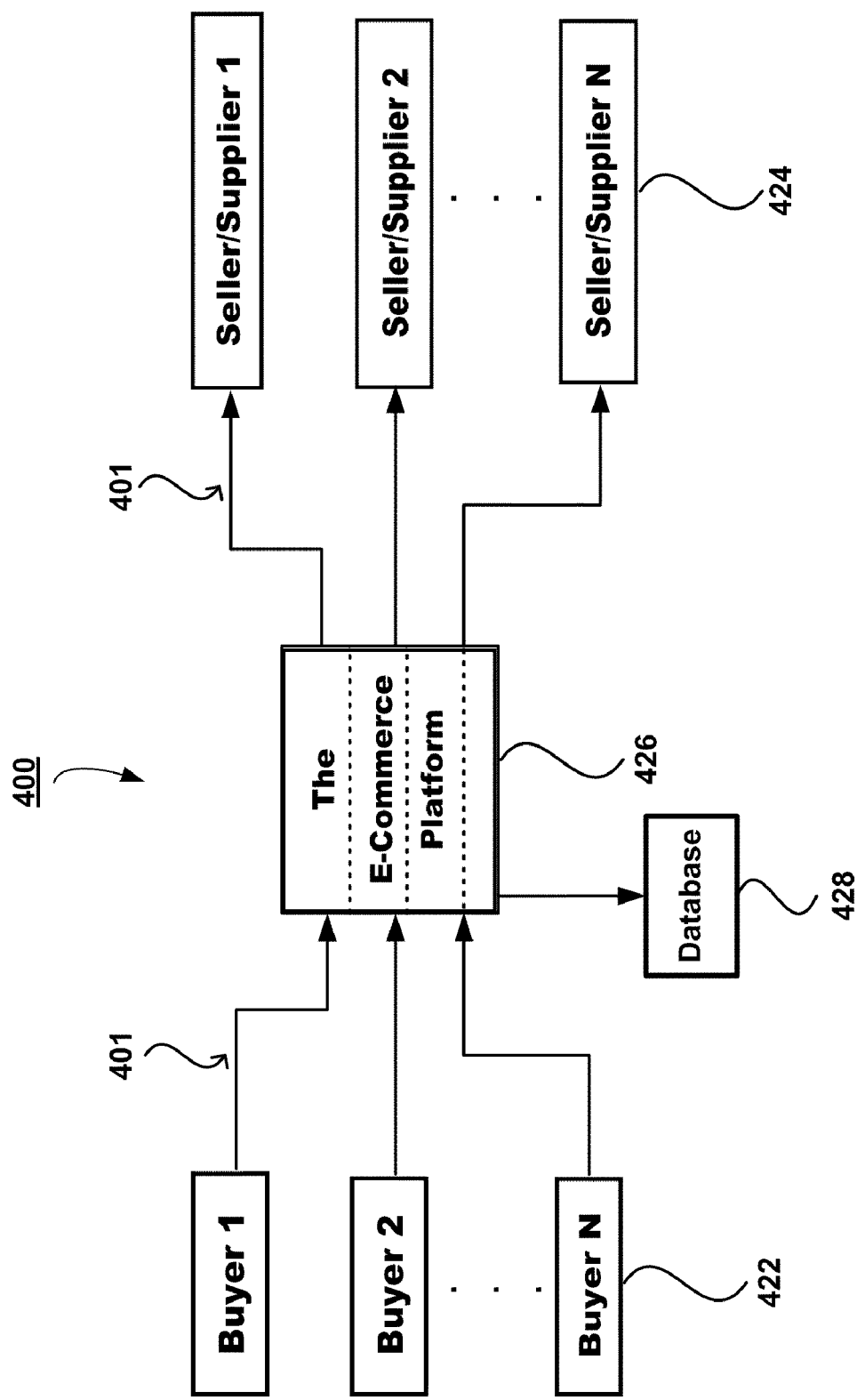
FIG. 4 illustrates an exemplary network environment in which an inventive e-commerce platform according to one embodiment of the present invention in communication with one or more seller client systems associated with a plurality of seller companies and one or more buyer client systems associated with a plurality of buyer companies through a network, such as the Internet.

Referring now to FIG. 4, the present invention, in another aspect, relates to an internet accessible computer system 400 to conduct business to business operations among a plurality of buyer companies and a plurality of seller/supplier companies. In one embodiment, the system 400 includes at least one buyer client system 422 associated with at least one buyer company, said at least one seller client system 424 associated with at least one seller company, at least one computer server 426 coupled to a database 428 for storing data, and a network 401 connecting at least one seller client system 424 and at least one buyer client system 422 to at least one computer server 426. The network 401 is the Internet or at least a part of the Internet.

The internet accessible computer system 400 can be utilized to conduct business to business operations among a plurality of buyer companies and a plurality of seller companies.

Figure 5:
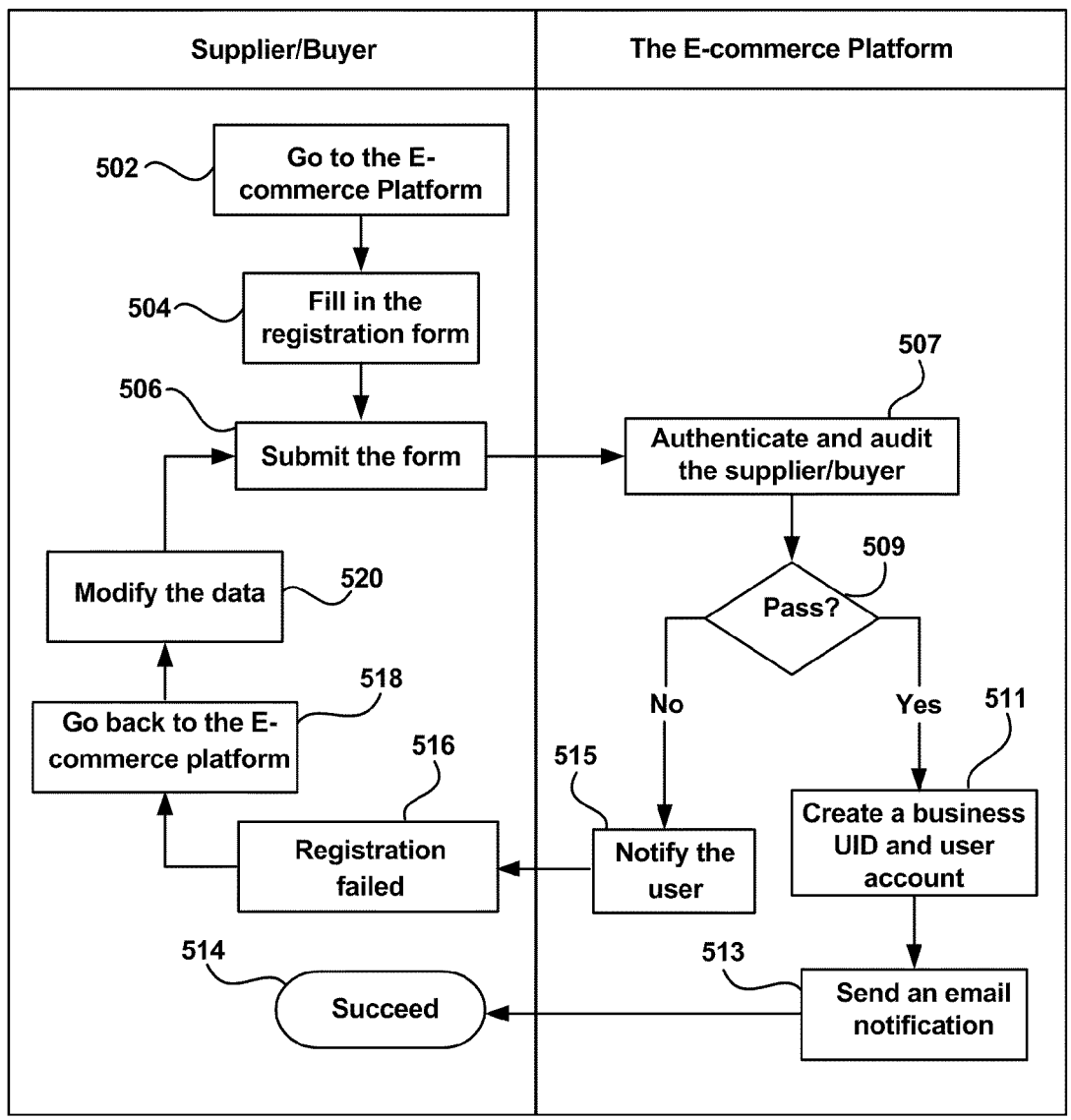
FIG. 5 is a flow diagram illustrating a procedure for registering a seller company and a buyer company, wherein the seller company sells goods to a corresponding buyer company, and the corresponding buyer company makes payment for the goods sold by that seller company, according to one embodiment of the present invention.

In one embodiment of the present invention, referring now to FIG. 5, where a flow diagram illustrating a procedure 500 for registering a seller company and/or a buyer company to the e-commerce platform or computer server 426 is shown, the seller company sells goods to a corresponding buyer company, and the corresponding buyer company makes payment for the goods sold by that seller company. At step 502, a seller/supplier company and/or a buyer company logs on to the e-commerce platform or computer server 426 through a seller client system 424 and/or a buyer client system 422 by the network 401. At step 504, seller/supplier company and/or buyer company fills in the registration form, where a number of questions requesting information that at least includes general business information such as products, annual sales, business partners, etc., business bank account information, and user account information for identification and communication. At step 506, the filled up registration form is submitted by seller/supplier company and/or buyer company as applicant(s) to the computer server 426.

At step 507, after computer server 426 receives the filled up registration, authenticating and auditing is conducted on the applicant(s), being a seller/supplier company or a buyer company.

At step 509, computer server 426 checks the result of the authenticating and auditing process: if the result is negative (i.e., the applicant fails to pass the authenticating and auditing process), a notification to the effect is generated and sent to the applicant at step 515 by computer server 426; or if the result is positive (i.e., the applicant passes the authenticating and auditing process), computer server 426 at step 511 creates a confidential, unique identification number ("UID") and a corresponding user account for the applicant.

After computer server 426 at step 511 creates a confidential, unique identifier ("UID") and a corresponding user account for the applicant, at step 513, a notification to the effect is generated and sent to the applicant by computer server 426. At step 514, the applicant receives the notification, and can start to use its UID and user account to conduct business as further described infra. In the case of the applicant is a seller company, after the successful registration, the seller company can provide its unique, confidential business UID to its corresponding buyer company, to facilitate the registration of the corresponding buyer company or buyer companies as further described infra. If the seller company has a plurality of buyer companies, for examples, buyers A, B and C, the seller company would register three times to secure three UIDs for buyers A, B and C, respectively.

Alternatively, after a notification of failing to pass is generated and sent to the applicant at step 515 by computer server 426, the applicant receives the notification of failing the registration at step 516. The applicant at step 518 can go back to the e-commerce platform and modify or supplement the data and/or information at step 520. A new or modified registration form can then be submitted by the applicant to the computer server 426 by backing to step 506.

Figure 5A:
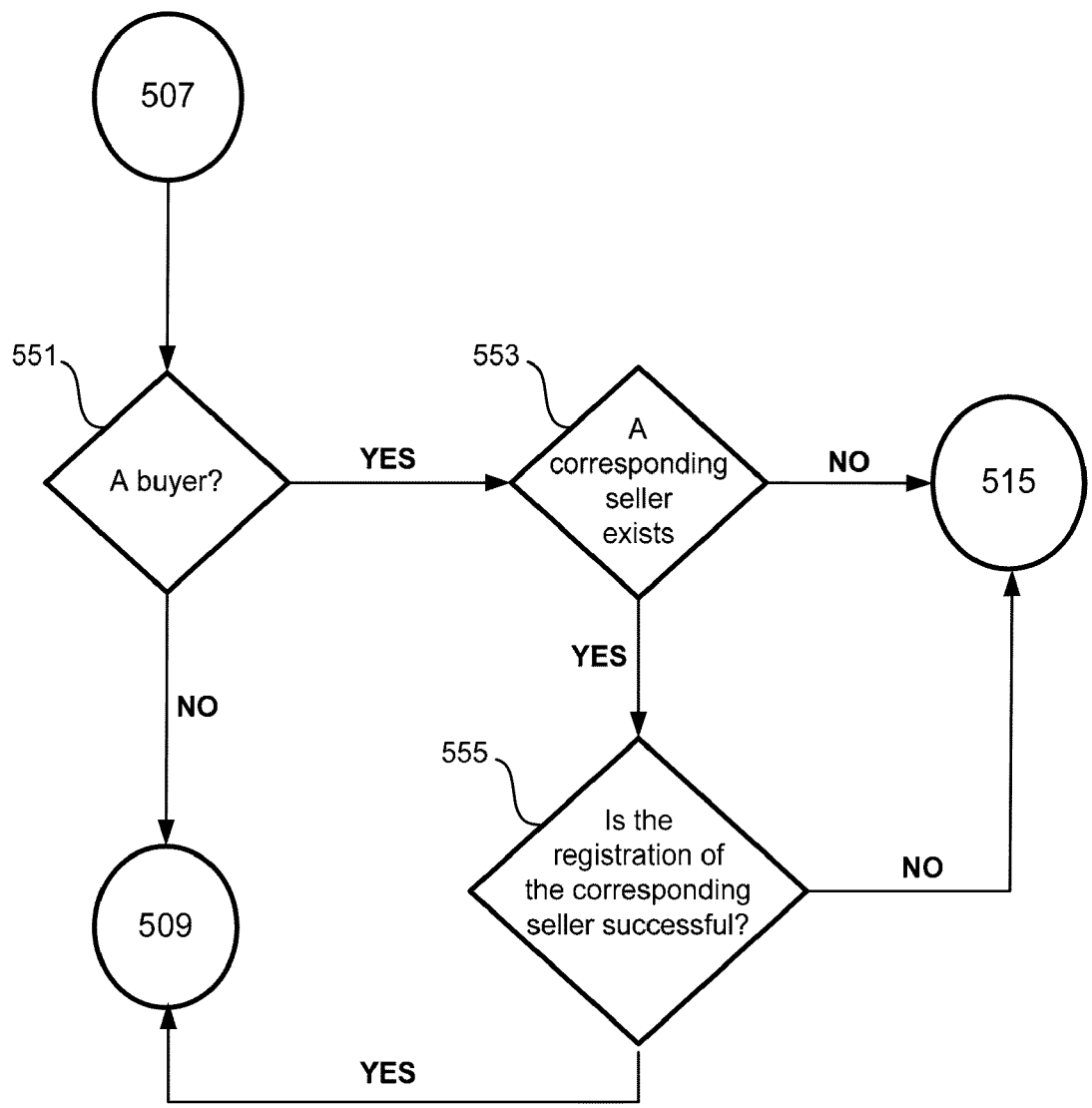
FIG. 5A is a flow diagram illustrating a sub-procedure of the procedure for registering a seller company and a buyer company, wherein the seller company sells goods to a corresponding buyer company, and the corresponding buyer company makes payment for the goods sold by that seller company, as shown in FIG. 5, according to one embodiment of the present invention.

The authenticating and auditing process may be conducted fully or at least partially by computer server 426. Referring now to both FIG. 5 and FIG. 5A, according to one embodiment of the present invention, the authenticating and auditing process includes at step 551, it is checked whether the applicant is a buyer company.

If the applicant is not a buyer company, it will be deemed as a seller company and the registration process continues to step 509.

If the applicant is a buyer company, at step 553, computer server 426 checks whether there is a corresponding seller company that exists for the buyer company applicant. If there is no corresponding seller company that exists for the buyer company applicant, the registration process continues to step 515, at which a notification of failing to pass is generated and sent to the applicant by computer server 426 as discussed above. If there is a corresponding seller company that exists for the buyer company applicant, at step 555, computer server 426 further checks whether the corresponding seller company has successfully registered with the computer server 426, which can be done, for example, by asking the buyer applicant to provide the corresponding seller company's UID. If the registration of the corresponding seller company is successful, the registration process for the buyer company applicant continues to step 509. Alternatively, if the registration of the corresponding seller company is not successful, the registration process for the buyer company applicant continues to step 515, at which a notification of failing to pass is generated and sent to the applicant by computer server 426 as discussed above.

It is noted that as set forth above, among other things, the registration of a buyer company depends on the registration of its corresponding seller company. That is, a buyer company may not be able to register with the e-commerce platform if its corresponding seller company is not able to successfully register with the e-commerce platform. Likewise, the registration of a seller company also depends on the existence of its corresponding buyer company/companies. In other words, a seller company may also not be able to register, or maintain the registration if it has registered, with the e-commerce platform if its corresponding buyer company/companies are not able to successfully register with the e-commerce platform.

It is further noted that a seller/supplier company may have one buyer company or a plurality of buyer companies. The seller/supplier company may have different pricing scheme for each buyer. The registration procedure implemented by the e-commerce platform discussed above ensures that there is a pairing of a buyer and a corresponding seller through a "virtual channel" identified by the UID of the seller company such that no other buyers of this seller company would be able to see the transaction information related to this particular buyer and the seller, which will be further revisited infra.

It is additionally noted that the authenticating and auditing process may be conducted partially by professionals who may pay on-site visit and/check buyer/seller companies, review related financial data, record, and materials, review legal documents, etc., in a process that often refers to as "due diligence."

Seller/supplier's Product Management Process

Figure 6:
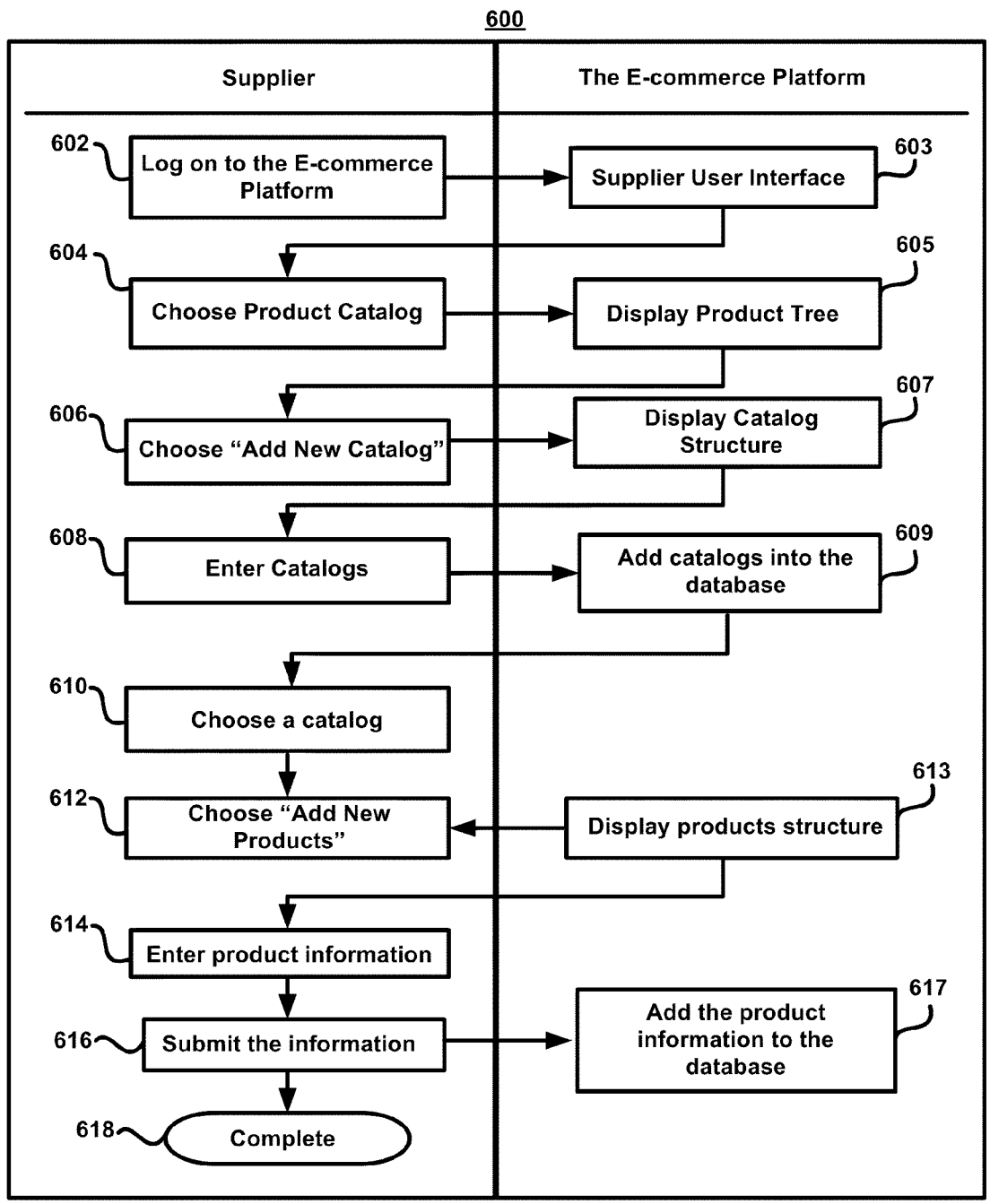
FIG. 6 is a flow diagram illustrating a procedure for a registered seller company to conduct business operation using an inventive e-commerce platform according to one embodiment of the present invention.

In one embodiment of the present invention, referring now to FIG. 6, a flow diagram illustrating a procedure 600 for a registered seller company to conduct business operation, more specifically, product management, by utilizing the e-commerce platform or computer server 426 is shown.

At step 602, a seller/supplier company logs on to the e-commerce platform or computer server 426 through a seller client system 424 by the network 401 with its UID and password.

At step 603, a seller or supplier user interface ("SUI") is presented to the seller company by computer server 426, which allows the seller company at step 604 to choose a product catalog that contains products the seller company offers to its buyers.

At step 605, computer server 426 displays product tree, which contains data related to the products of the product catalog and stored in database 428, on the SUI to the seller company.

The seller company may edit current product catalog, or add new line/catalog of products or add new product(s) to an existing line/catalog of products.

At step 606, the seller company may choose the option to "add new product catalog" that allows the seller company to add a new line/catalog of products that can be offered to its buyers through the SUI.

At step 607, in response, computer server 426 displays a catalog structure on the SUI to the seller company to allow information to be entered through the SUI.

At step 608, the seller company may add one or more new catalogs through the SUI.

At step 609, computer server 426 receives the information regarding one or more new catalogs which is entered by the seller company through the SUI and stores it in database 428 accordingly.

If the seller company wants to add new product(s) to an existing line/catalog of products, at step 610, the seller company may choose a catalog displayed on the SUI. At step 612, the seller company may further choose the option of "add new products" that allows the seller company to add new products that can be offered to its buyers to the chosen catalog.

At step 613, in response, computer server 426 displays products structure for the chosen catalog on the SUI to the seller company to allow information to be entered through the SUI.

At step 614, the seller company may enter information for one or more new products into the chosen catalog through the SUI.

At step 616, the seller company submits the entered information for one or more new products into the chosen catalog through the SUI to computer server 426, which at step 617 receives the entered information for one or more new products into the chosen catalog through the SUI and stores it in database 428 accordingly.

At step 618, the seller company completes the procedure 600 and logs off.

It is noted that when it logs on to the e-commerce platform, the seller/supplier may post a wide spectrum of product information that public in general and trading partner(s) of the seller company in particular are interested in. The product information may include information related to inventory, pricing, use, introduction, etc. The pricing information normally includes two types of prices for a particular product: a discounted price and a reference price. The discounted price is given to the e-commerce platform provider by the seller to allow the seller to provide its products to the e-commerce platform at a discounted price, or wholesale price, which is only internally viewable by the e-commerce platform, which in turn would offer the seller's product to the users of the e-commerce platform in a general product catalog that is accessible by all users of the e-commerce platform. The reference price is given to the seller's buyer(s), which can only be viewed by the seller's buyer(s) who is given the seller's UID, which will be further discussed infra. The seller can negotiate a final price for a particular product with a buyer via the e-commerce platform.

It is further noted that after each transaction, the e-commerce platform automatically adjusts available inventory capacity for the products involved. Meanwhile the seller can update the inventory for the products using the procedure discussed above in connection with FIG. 6.

Buyer's Product Ordering Process

Figure 7:
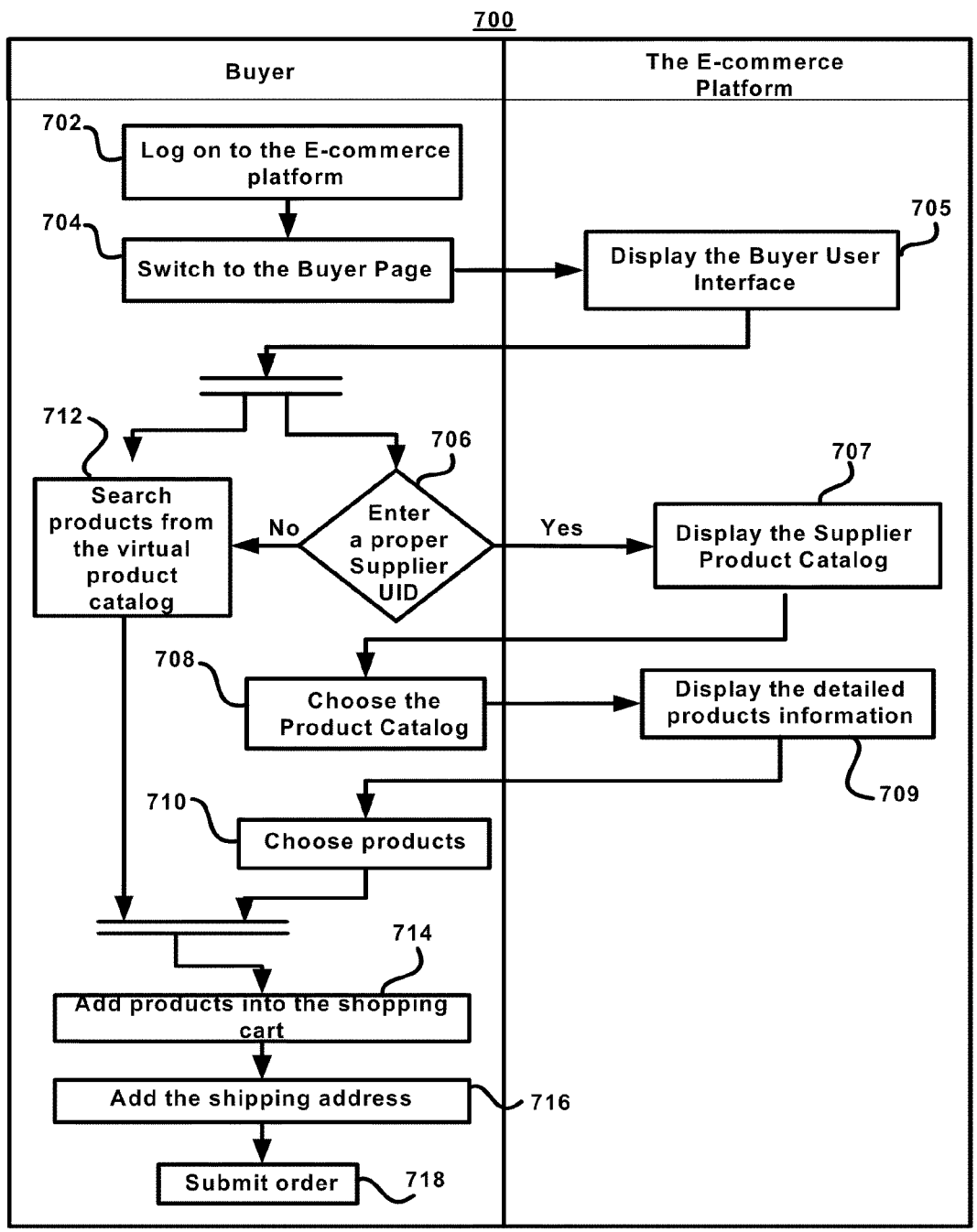
FIG. 7 is a flow diagram illustrating a procedure for a registered buyer company to conduct business operation using an inventive e-commerce platform according to one embodiment of the present invention.

In one embodiment of the present invention, referring now to FIG. 7, a flow diagram illustrating a procedure 700 for a registered buyer company to conduct business operation, more specifically, product ordering, by utilizing the e-commerce platform or computer server 426 is shown.

At step 702, a buyer company logs on to the e-commerce platform or computer server 426 through a buyer client system 422 by the network 401 with its UID and password.

At step 704, the buyer company switches to a buyer page presented by computer server 426, which also displays a buyer user interface ("BUI") at step 705 to allow the buyer company to choose whether the buyer company wants to search for product in a general product catalog that is accessible by all users of the e-commerce platform or to search a product catalog that is offered by a seller company to whom the buyer company is a trading partner, i.e., the buyer company buys products from the seller company, has the seller company's UID, and has an existing relationship with the seller company.

If the buyer company wants to search for product in a general product catalog that is accessible by all users of the e-commerce platform, then at step 712, the buyer company searches for products from the "virtual" general product catalog. If the buyer company finds product or products it wants, at step 714, the buyer company adds the product(s) into a shopping cart offered by the BUI.

If the buyer company wants to search for product in a product catalog that is offered by a seller company to whom the buyer company is a trading partner, then at step 706, the buyer company enters a proper seller (or supplier) company's UID to identify itself to the e-commerce platform as a trading partner of that seller company. If no proper seller company's UID is entered, the buyer company is directed to step 712 to continue the procedure.

If a proper seller company's UID is entered, the buyer company is directed to step 707, where in response, computer server 426 displays the product catalog(s) of that seller company on the BUI to the buyer company.

At step 708, the buyer company may choose a particular product catalog from the available product catalogs of the seller company.

At step 709, in response, computer server 426 displays detailed product information for products in that particular product catalog on the BUI to the buyer company to help the buyer company make informed choice of product(s).

At step 710, the buyer company chooses product(s) it wants through the SUI.

At step 714, the buyer company adds the product(s) into a shopping cart offered by the BUI.

At step 716, the buyer company enters its shipping address through the BUI and then submits its order at step 718, which completes an exemplary ordering process of the buyer company through the e-commerce platform.

A Complete Trading Process by a Registered Seller and a Registered Buyer

Figure 8:
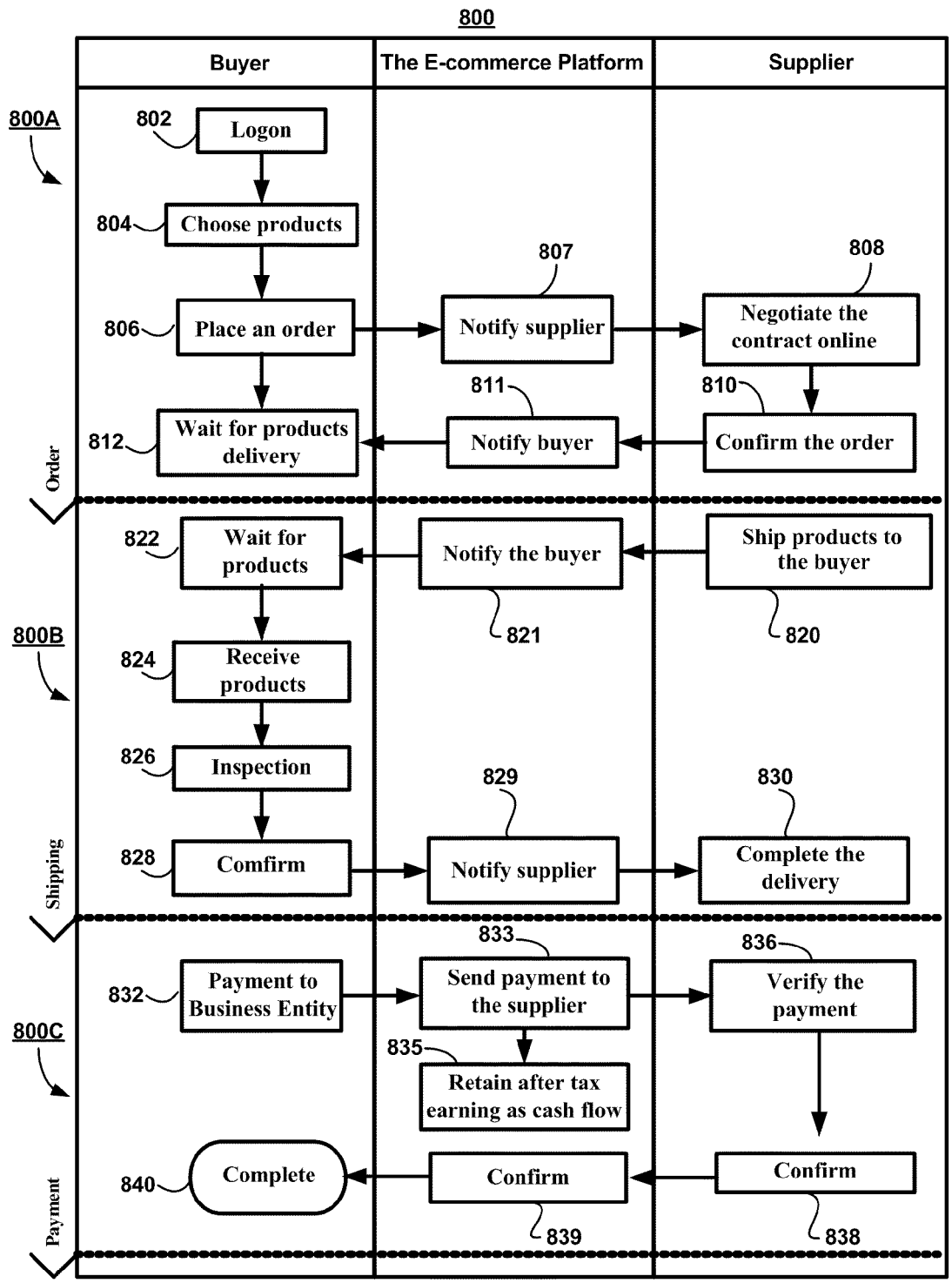
FIG. 8 is a flow diagram illustrating a procedure for a registered seller company and a registered corresponding buyer company to conduct business operation using an inventive e-commerce platform according to one embodiment of the present invention.

In one embodiment of the present invention, referring now to FIG. 8, a flow diagram illustrating a procedure 800 for a registered seller company and a corresponding registered buyer company to conduct business operation, more specifically, to perform a complete trading process, by utilizing the inventive e-commerce platform or computer server 426 is shown, which in general an be divided into three phases, an order phase 800A, a shipping phase 800B, and a payment phase 800C. Some of the steps disclosed below have been also discussed in more details in sections set forth above.

In the order phase 800A, at step 802, a buyer company logs on to the e-commerce platform or computer server 426 through a buyer client system 422 by the network 401 with its UID and password.

At step 804, the buyer company finds and chooses product(s) it wants through a corresponding SUI.

At step 806, the buyer company places an order for the product(s) and submits its order to computer server 426.

At step 807, in response, computer server 426 receives the order, makes proper book entries for the order, stores relevant information in database 428, and notifies a corresponding seller/supplier company.

At step 808, the seller company receives the notification and negotiate a contract at least partially online with the buyer, which can be done by using communication tools such as emails, voice over IP, skype, e-fax, and the like. Once the seller company and the buyer company reach an agreement with specific terms regarding the order, at step 810, the seller company sends a confirmation to computer server 426. The final contracts and related documents are stored in the computer server 426 in electronic formats.

At step 811, in response, computer server 426 receives the order confirmation, makes proper book entries for the order confirmation, stores relevant information in database 428, and notifies the buyer company.

At step 812, the buyer company receives the order confirmation from computer server 426 and waits from product delivery that is done in shipping phase 800B.

In the shipping phase 800B, at step 820, the seller company ships the products to the buyer and sends a notification to computer server 426, which may also be sent to the buyer company at the same time or separately.

At step 821, computer server 426 receives the shipping confirmation, makes proper book entries for the shipping confirmation, stores relevant information in database 428, and notifies the buyer company.

At step 822, the buyer company receives the shipping confirmation from computer server 426 and waits for the physical delivery of the products. The buyer company may also receive the shipping notification from the seller company.

At step 824, the buyer company receives the physical delivery of the products.

Once the buyer company makes completes a physical inspection of the delivered goods, at step 826, the buyer company sends a confirmation of delivery to computer server 426 at step 828, which may also be sent to the seller company at the same time or separately.

At step 829, computer server 426 receives the confirmation of delivery, makes proper book entries for the confirmation of delivery, stores relevant information in database 428, and notifies the seller company.

At step 830, the seller company receives the confirmation of delivery from computer server 426. The seller company may also receive the confirmation of delivery from the buyer company. Now the seller company waits for payment that is done in payment phase 800C.

For exemplary purpose and benefits of readers of this disclosure, it is assumed here that for the embodiment discussed here, the value of the products sold from the seller company is $M_1=\$1M$, the tax rate is zero (0), i.e. $R_{tax}=0$, the costs of the products are $M_2=\$900K$, and the amount $(M_1-M_2)=\$100K$ is the after-tax earning the seller company would make from this sale.

In the payment phase 800C, at step 832, the buyer company makes a payment of $M_1=\$1M$ to the business entity 318 and sends payment notification to computer server 426, which may also receive a payment notification from a bank that receives the payment on behalf of the business entity 318 from the buyer company at the same time or separately.

At step 833, computer server 426 receives the payment notification, makes proper book entries for the payment notification, makes payment in the amount of $M_2=\$900K$ to the seller company, stores relevant information in database 428, and notifies the seller company. The business entity 318 retains the amount $(M_1-M_2)=\$100K$ as the after-tax earning at step 835, and computer server 426 makes proper book entries for the earning in relation to the seller company, and stores relevant information in database 428.

At step 836, the seller company receives the payment in the amount of $M_2=\$900K$ from computer server 426 and verifies the payment.

At step 838, the seller company sends a confirmation of payment to computer server 426 at step 828.

At step 839, computer server 426 receives the confirmation of payment, makes proper book entries for the confirmation of payment, and stores relevant information in database 428.

At step 840, computer server 426 may send a notification of closed transaction to the buyer company, which completes the transaction illustrated as the payment phase 800C, and hence the whole procedure 800.

Issuing a Number of Convertible Preference Shares to a Plurality of Seller Companies One aspect of the present invention relates to issuing by business entity 318 a number $N_{cs}$ of convertible preference shares to the plurality of seller companies in consideration of the after tax earnings retained by business entity 318 from these seller companies.

In one exemplary embodiment, referring now to FIGS. 13, 14 and 15, at the beginning of a fiscal year, time $T_0$, business entity 318 would issue a number $N_{cs}$ of convertible preference shares to the plurality of seller companies, where the $N_{cs}$ convertible shares are convertible to $N_{rs}$ ordinary shares of the business entity over a period of time T counting from time $T_0$, according to the following formula:

$$N_{cs}=(PAE \times L)/SP_0,$$

where the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$.

In a particular example as illustrated in FIG. 13, it is assumed that for a plurality of registered seller companies, Jul. 1, 2009 is the beginning of a fiscal year, $T_0$, the period of time T is 10 years, which means T is divided into a predetermined number L=10 of fiscal years, and PAE=$300M, which means the projected annual after-tax earning that the plurality of seller companies would make is $300M for the first fiscal year ended at Jun. 30, 2010, the second fiscal year ended at Jun. 30, 2011, . . . , the ith fiscal year ended at June 30 of the ith fiscal year, i=1, 2, . . . , L=10, . . . , and the 10th fiscal year ended at Jun. 30, 2019. During the first fiscal year, there are 100M (million) ordinary shares of business entity 318 traded in a capital market. The stock price per share for the ordinary shares of the business entity averaged over a predetermined time period around time $T_0$, here Jul. 1, 2009 is $SP_0=\$45$. The predetermined time period for averaging stock price can be 30 days, 45 days, 60 days, 90 days or any number of days. Thus, the number $N_{cs}$ of convertible preference shares to the plurality of seller companies that are convertible to a number of ordinary shares of the business entity 318 over a period of 10 years counting from Jul. 1, 2009, is determined by (note for simplicity the number is rounded to 10 thousands):

$$N_{cs}=(PAE\times L)/SP_0=\$300M\times 10/\$45=66.67M.$$

According to one embodiment of the present invention, these 66.67M convertible preference shares may be converted a number of ordinary shares of the business entity 318 over 10 years subjecting to a maximum number $N_{rs}$, which is determined by the following formula:

$$N_{rs}=\Sigma^L_{i=1}N_{cs}(i)\times\alpha_i,$$

where $\{\alpha_i\}$ satisfy the condition of $\Sigma^L_{i=1}\alpha_i\leq 1$, i=1, 2, ..., L=10. With this condition, the number of ordinary shares of the business entity 318 over the period of time T converted from $N_{cs}$ convertible preference shares issued to the plurality of seller companies is no greater than the maximum number $N_{rs}$, and also at any given ith year, the number of ordinary shares of the business entity 318 over that year converted by the plurality of seller companies is no greater than $N_{cs}(i)\times\alpha_i$.

Referring now to FIG. 13, in one exemplary embodiment, the values of $\{\alpha_i\}$ are given in row 8 counting from top of Table I as $\{\alpha_i, i=1, 2, ..., 10\}=\{0.20, 0.15, 0.10, 0.10, 0.10, 0.10, 0.10, 0.05, 0.05, 0.05\}$. Accordingly, the maximum number of convertible preference shares can be converted each year are given in row 9 counting from top of Table I as $\{N_{cs}+\alpha_i, i=1, 2, ..., 10\}=\{66.67M\times(0.20, 0.15, 0.10, 0.10, 0.10, 0.10, 0.10, 0.05, 0.05, 0.05)\}=\{13.33M, 10.00M, 6.67M, 6.67M, 6.67M, 6.67M, 6.67M, 3.34M, 3.34M, 3.34M\}$. It is noted that the sum of the row 9 gives $$N_{rs}=\Sigma^L_{i=1}N_{cs}(i)\times\alpha_i=66.67M \text{ (shares)}.$$

Other sets of $\{\alpha_i\}$ with different choices of values can also be used to practice the present invention as long as each choice satisfies the condition of $\Sigma^L_{i=1}\alpha_i\leq 1$. As shown in FIG. 14, Table II provides 5 (five) different exemplary sets of $\{\alpha_i\}$, where the set of $\{\alpha_i\}$ given in row 3 counting from top of Table II is disclosed above, providing a choice of spreading convertible shares over the 10 years period with potentially more shares available at the early years, the set of $\{\alpha_i\}$ given in row 4 counting from top of Table II is disclosed above, providing a choice of spreading convertible shares over the 10 years period with a potentially even distribution, and the set of $\{\alpha_i\}$ given in row 5 counting from top of Table II is disclosed above, providing a choice of spreading convertible shares over the 10 years period every other year.

The Number of Convertible Preference Shares Converted by the Plurality of Seller Companies By having a number of convertible preference shares that can be converted to ordinary shares of the business entity 318 over a period of time, each seller company may be able to access to the capital market where the business entity 318 is listed and may be motivated to develop a loyal relationship with the business entity 318 and conduct more transactions through the e-commerce platform. To a certain degree, each seller company becomes an investor in the business entity 318 and thus expects returns from its investments in the business entity 318—the operating profits retained by the business entity 318. In particular, if the operating profits of a seller company grow over time, the seller company would expect more convertible preference shares can be converted. On the other hand, when the stock price of the ordinary shares of the business entity 318 is higher than that is expected when the number of convertible preference shares is issued to the plurality of seller companies, the business entity would hope, and the seller company would expect less convertible preference shares may be converted but its expectation of return would still be met. For examples, assuming a seller company has an expectation of return in terms of stocks in the amount of $500,000 for a given year, if the stock price of the ordinary shares of the business entity 318 is $50, that expectation of return would be met if there were 10,000 convertible preference shares to be converted; however, if the stock price of the ordinary shares of the business entity 318 is $500, that expectation of return would be met if there were only 1,000 convertible preference shares to be converted. The challenge is to develop such a model and method that can balance all these and other factors that sometimes are acting against each other.

In one aspect, the present invention provides a model and method that answers this challenge.

Particularly, in one embodiment, a processor of the computer server 426 is programmed for aggregating in every fiscal year over the period of time T by the computer server all the cash or cash equivalents payments received from the plurality of buyer companies into a first amount, $\{M_{1i}, i=1, ..., L\}$;

making cash or cash equivalents payments by the business entity 318 to the plurality of seller companies aggregated in a second amount, $\{M_{2i}, i=1, ..., L\}$, in every fiscal year over the period of time T, wherein $M_{1i}$ and $M_{2i}$ satisfy the following relationships:

$$M_{2i}<M_{1i}, \text{ and}$$

$$(M_{1i}-M_{2i})\times(1-R_{tax})=E_i,$$

wherein $E_i$ is the after-tax earning that the plurality of seller companies would make from the sales of the goods to the plurality of corresponding buyer companies over the ith fiscal year; and making book entries on the computer server 426 for all the cash or cash equivalents payments made and storing corresponding records of the book entries in the database 428 coupled with the computer server 426.

The business entity 318 retains $\{E_i, i=1, ..., L\}$ as the cash flow to back the ordinary shares of the business entity publicly traded in the capital market, and book entries are made on the computer server 426 for all the cash flow retained and corresponding records of the book entries are stored in the database 428.

Furthermore, a processor of the computer server 426 is programmed for calculating the earning growth, $\Delta E_i$, of the ith year from the immediate prior year, the (i−1)th year, by the following formula:

$$\Delta E_i=E_i-E_{i-1}.$$

In one exemplary embodiment as shown in Table III of FIG. 15, where the example used in FIG. 13 is again used, it is assumed that T=10 fiscal years, L=10, and during the first fiscal year, Jul. 1, 2009 to Jun. 30, 2010, there are 100M (million) ordinary shares of business entity 318 traded in a capital market with an earning per share ratio $PE_0=15$. For a given ith fiscal year, the corresponding earning per share ratio is denoted as $PE_i$.

Moreover, the values of $\{E_i\}$ in units of $M (million) are given in row 3 counting from top of Table III as $\{E_i, i=1,$ 2, ..., 10}={300, 600, 1,200, 2,400, 4,800, 9,600, 19,200, 38,400, 76,800, 153,600}. Note that at the year zero, i.e., prior to the first fiscal year, $E_0$ is set to be a default value as $E_0=0$.

The values of $\{\Delta E_i\}$ in units of $M (million), which are calculated by a processor of the computer server 426 using the formula as set forth above, are given in row 4 counting from top of Table III as $\{\Delta E_i, i=1, 2, \ldots, 10\}=\{300, 300, 600, 1,200, 2,400, 4,800, 9,600, 19,200, 38,400, 76,800\}$.

The values of $\{PE_i\}$ in units of $M (million), which are determined by the dynamics of the capital markets in reality and are assumed here for the benefits of readers to show how the model and methods of the present invention is practiced, are given in row 5 counting from top of Table III as $\{\Delta E_i, i=1, 2, \ldots, 10\}=\{15, 50, 20, 30, 40, 25, 28, 35, 40, 48\}$.

A function $N^i_{rs}(\Delta E_i, SP_i)$, which satisfies the following formulas:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

is calculated by a processor of the computer server 426 for $i=1, 2, \ldots, L=10$, where $SP_i$ is the market stock price per share for the ordinary shares of the business entity 318 averaged over a predetermined time period around the end of the ith fiscal year such as 30 days, 45 days, 90 days, or any other number of days.

It is noted first that the first formula, $\partial N^i_{rs}(\Delta E_i, SP_i)/\partial \Delta E_i \geq 0$, indicating that $N^i_{rs}(\Delta E_i, SP_i)$ is a function of variable $\Delta E_i$, and when $\Delta E_i$ increases, $N^i_{rs}(\Delta E_i, SP_i)$ increases accordingly. In other words, $N^i_{rs}(\Delta E_i, SP_i)$ is proportional to $(\Delta E_i)^q$, where q is a positive number. This relationship between $N^i_{rs}(\Delta E_i, SP_i)$ and $\Delta E_i$ represents that if the operating profits of a seller company grow over time, the seller company would expect more convertible preference shares can be converted.

If is further noted that the second formula, $\partial N^i_{rs}(\Delta E_i, SP_i)/\partial SP_i \leq 0$, indicating that $N^i_{rs}(\Delta E_i, SP_i)$ is a function of variable $SP_i$, and when $SP_i$ increases, $N^i_{rs}(\Delta E_i, SP_i)$ decreases accordingly. In other words, $N^i_{rs}(\Delta E_i, SP_i)$ is proportional to $(SP_1)^{-r}$, where r is a positive number. This relationship between $N^i_{rs}(\Delta E_i, SP_i)$ and $SP_i$ represents that, when the stock price of the ordinary shares of the business entity 318 is higher than that is expected when the number of convertible preference shares is issued to the plurality of seller companies, the expectation of return could be met by less number of convertible preference shares that may be converted by the seller company.

The total number of ordinary shares of the business entity 318 converted for the ith year for the plurality of seller companies, $N^i_{rs}$, is calculated by the computer server 426 from the following relationship:

$$N^i_{rs}=\text{Min}(N^i_{rs}(\Delta E_i, SP_i), \Sigma^i_{k=1} N_{cs}(k) \times \alpha_{i+1-k}),$$

where $N^i_{rs}$ ordinary shares of the business entity will be delivered to the plurality of seller companies at the end of the ith year, $i=1, 2, \ldots, L$.

In general, $N^i_{rs}(\Delta E_i, SP_i)$ can be in the form of $$N^i_{rs}(\Delta E_i, SP_i)=[\Sigma^i_{k=1} C_k \Delta E^s_k/SP^t_i],$$

where $C_k$ is a constant, s is a positive number, t is a positive number, $k=1, \ldots, i$, and $i=1, 2, \ldots, L$. This type of summation provides a perfect project for a processor of the computer server 426.

In one embodiment, $N^i_{rs}(\Delta E_i, SP_i)$ is in the form of $$N^i_{rs}(\Delta E_i, SP_i)=C_0[\Sigma^i_{k=1} \Delta E_k/SP_i],$$

wherein $C_0$ is a predetermined positive constant, and $N^i_{rs}$ is calculated from the following relationship:

$$N^i_{rs}=\text{Min}(C_0[\Sigma^i_{k=1} \Delta E_k/SP_i], \Sigma^i_{k=1} N_{cs}(k) \times \alpha_{i+1-k}), i=1, 2, \ldots, L.$$

Still referring to FIG. 15, and using $N^i_{rs}(\Delta E_i, SP_i)=C_0[\Sigma^i_{k=1} \Delta E_k/SP_k]$, one can having the following exemplary results that are calculated by a processor of the computer server 426:

For the 1$^{st}$ fiscal year, the end of year is Jun. 30, 2010, $i=1$, one has:

$E_1=\$300M$, $\Delta E_1=\$300M$, $N_t=100M$ shares, $PE_1=15$ ($/share), $C_0=2$, $SP_1=PE_1 \times$ total earning/total shares $=PE_1 \times E_1/N_t=15 \times \$300M/100M=\$45$, which is given in the 6$^{th}$ row of Table III counting from top for $i=1$ column, $N_{cs}(1)=E_1 \times L/SP_1=\$300M \times 10/\$45=66.67M$ (shares), $\alpha_1=0.2$, $N_{cs}(1) \times \alpha_1=66.67M \times 0.2=13.33M$, $C_0 \Sigma^i_{k=1} \Delta E_k/SP_i$ ($i=1$)$=C_0 \Delta E_1/SP_1=2 \times \$300M/\$45=13.33M$, and accordingly, $N^1_{rs}=\text{Min}(C_0[\Sigma^1_{k=1} \Delta E_k/SP_k], N_{cs} \times \alpha_1)=\text{Min}(13.33M, 13.33M)=13.33M$, which is listed in the second row of Table III counting from bottom for $i=1$ column. Therefore, at the end of the first fiscal year, there are 13.33M ordinary shares of the business entity 318 are converted from the total number of 66.67M convertible preference shares and delivered to the plurality of seller companies, which can be done by physical delivery and/or electronic delivery. Thus, now the total number of ordinary shares of business entity 318 in the capital market after the end of the first fiscal year is $N_t=100M$ shares+new converted shares=100M shares+$N^1_{rs}$=100M+13.33=113.33M shares.

It is noted that by choosing the constant $C_0=2$, the plurality of seller companies are given implied expectation of investment return of 200% for their investment of their operating profits of $300M because at the market price of $45 per share, the total number of 13.33M ordinary shares of the business entity 318 converted and delivered to them has a market value of 13.33M×$45=$600M=200%×$300M. Thus, for the chosen form of $N^i_{rs}(\Delta E_i, SP_i)=C_0[\Sigma^i_{k=1} \Delta E_k/SP_i]$, $C_0$ is the investment return multiple number for the plurality of seller companies and can be chosen as any other positive number.

Figure 9:
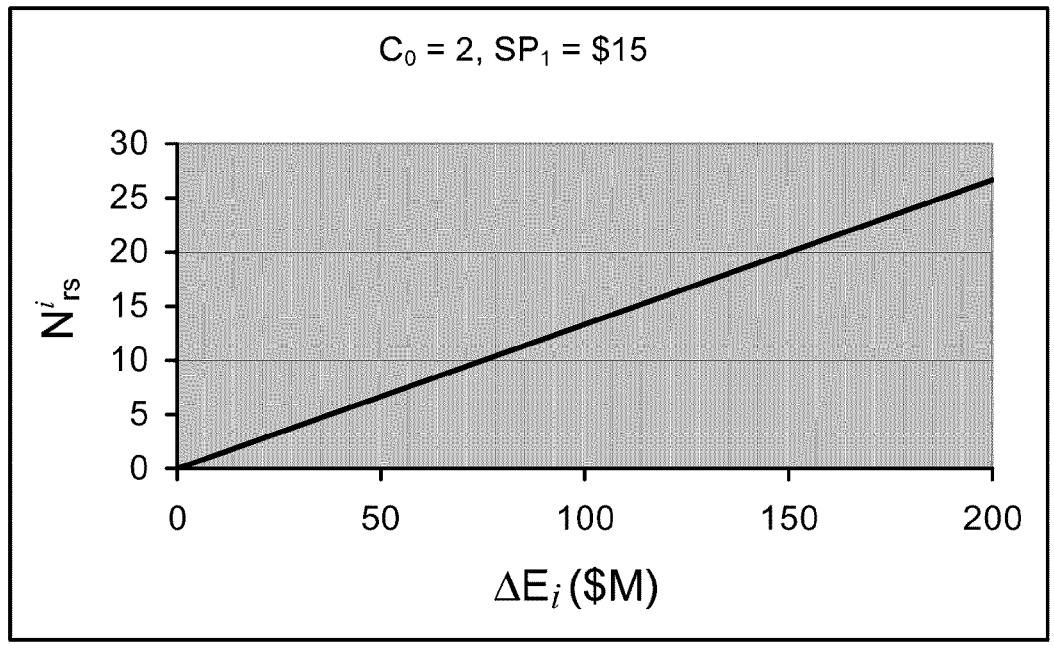
FIG. 9 illustrates a curve showing the function of $N^i_{rs}(\Delta E_i, SP_i) = C_0[\Sigma^i_{k=1} \Delta E_k/SP_i]$ as a variable of $\Delta E_k$ according to one embodiment of the present invention.
Figure 10:
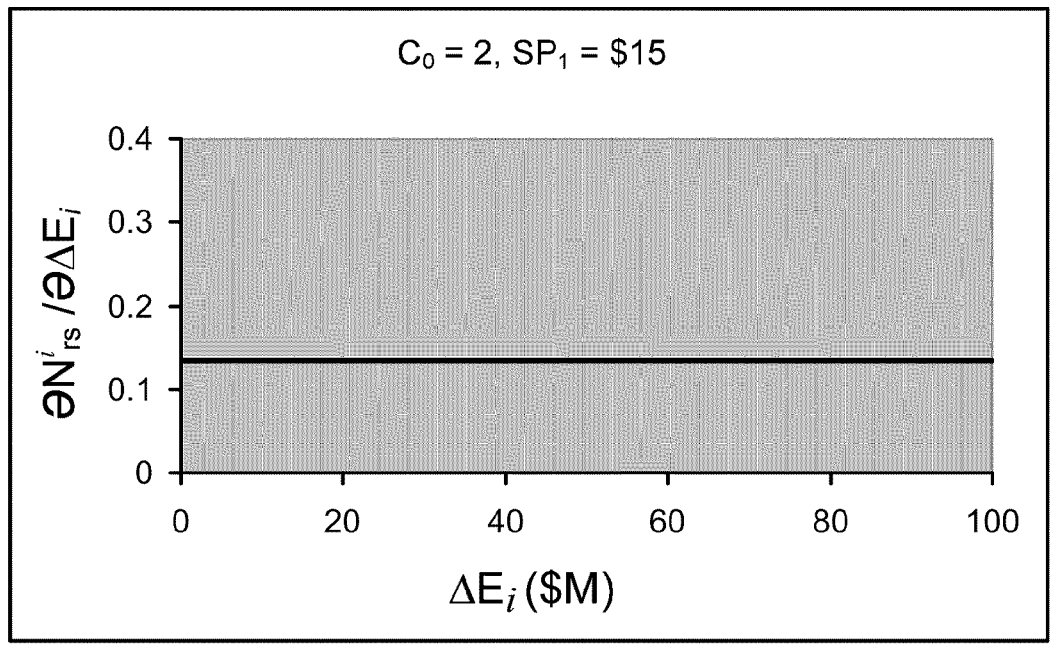
FIG. 10 illustrates a curve showing the derivative of the function of $N^i_{rs}(\Delta E_i, SP_i) = C_0[\Sigma^i_{k=1} \Delta E_k/SP_i]$ as a variable of $\Delta E_k$ according to one embodiment of the present invention using the same parameters used in FIG. 9.

Also, as can be seen from FIG. 9, which displays a curve showing the function of $N^i_{rs}(\Delta E_i, SP_i)=C_0[\Sigma^i_{k=1} \Delta E_k/SP_i]$ of variable $\Delta E_k$ (in unit of $) with parameters $i=1$, $C_0=2$, and $SP_1=\$15$, the function $N^1_{rs}(\Delta E_i, SP_1=\$15)=C_0 \Delta E_1/SP_1=2\Delta E_1/\$15$ now is a linear function of $\Delta E_1$ with a positive slope. The positive slope of the function $N^1_{rs}(\Delta E_i, SP_1=\$15)=2\Delta E_1/\$15$ is given by $\partial N^1_s(\Delta E_1, \$15)/\partial \Delta E_1=\partial(2\Delta E_1/\$15)/\partial \Delta E_1=2/15$, which is a greater than zero constant as shown in FIG. 10 and indicates that with the increase in the operating profits $\Delta E_1$, more convertible preference shares may be converted.

Figure 11:
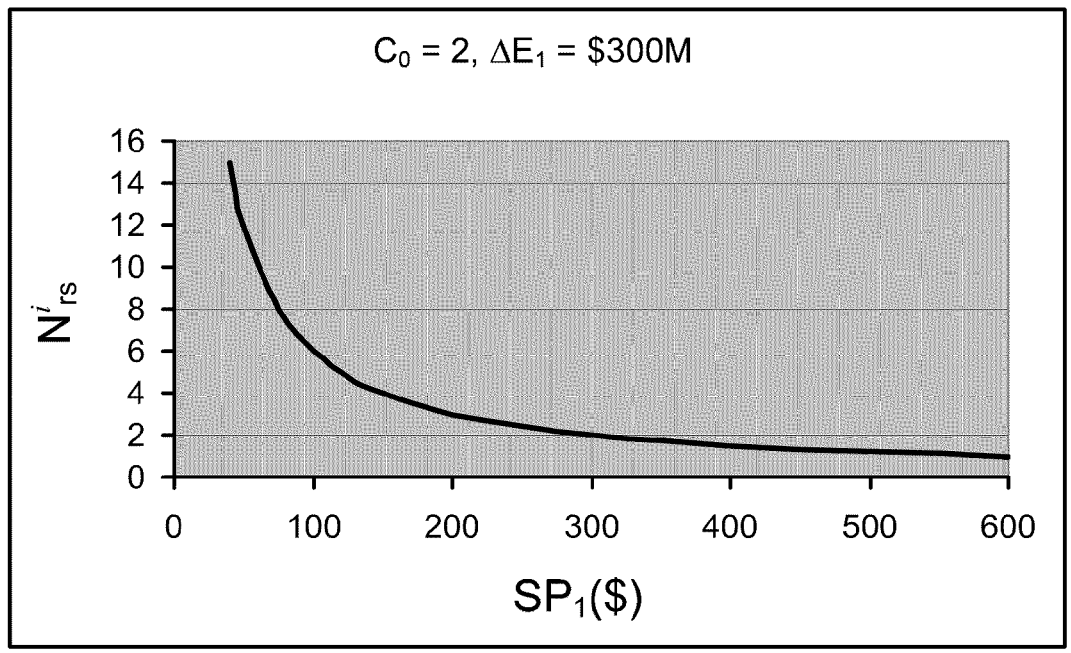
FIG. 11 illustrates a curve showing the function of $N^i_{rs}(\Delta E_i, SP_i) = C_0[\Sigma^i_{k=1} \Delta E_k/SP_i]$ as a variable of $SP_i$ according to one embodiment of the present invention.
Figure 12:
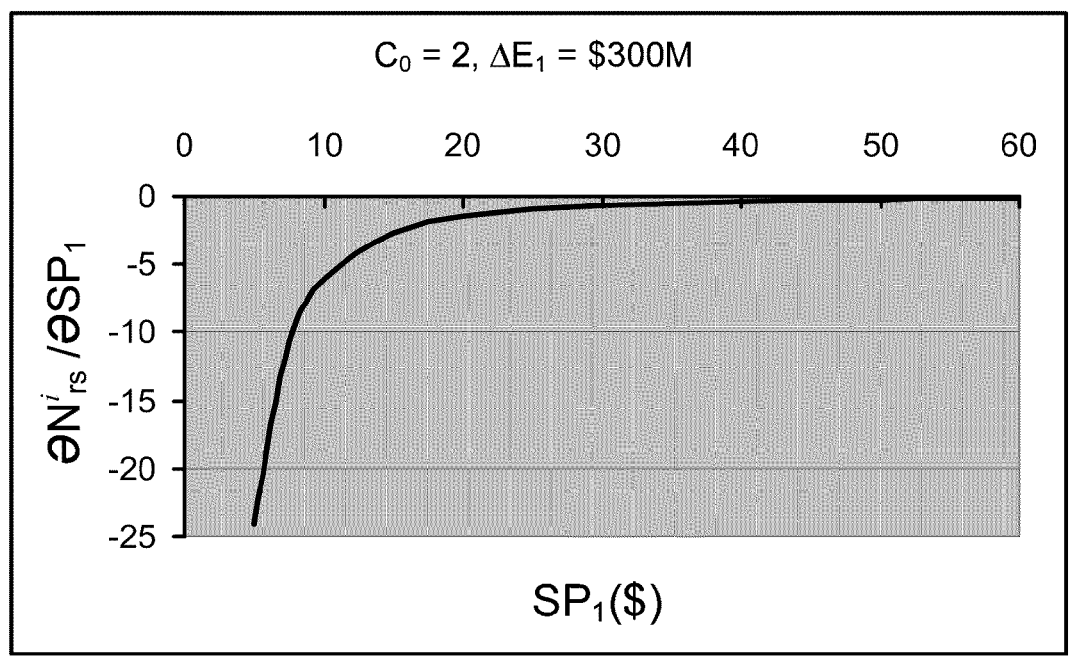
FIG. 12 illustrates a curve showing the derivative of the function of $N^i_{rs}(\Delta E_i, SP_i) = C_0[\Sigma^i_{k=1} \Delta E_k/SP_i]$ as a variable of $SP_k$ according to one embodiment of the present invention using the same parameters used in FIG. 11.

Additionally, as can be seen from FIG. 11, which displays a curve showing the function of $N^i_{rs}(\Delta E_i, SP_i)=C_0[\Sigma^i_{k=1} \Delta E_k/SP_i]$ of variable $SP_i$ (in unit of $) with parameters $i=1$, $C_0=2$, and $\Delta E_1=\$300M$, the function $N^1_{rs}(\Delta E_1=\$300M, SP_1)=C_0 \Delta E_1/SP_1=2 \times \$300M/SP_1$ now is an inverse function of $SP_1$ with a negative slope. The negative slope of the function $N^1_{rs}(\Delta E_1=\$300M, SP_1)=2 \times \$300M/SP_1$ is given by $\partial N^1_s(\Delta E_1=\$300M, SP_1)/\partial SP_1=\partial(2 \times \$300M/SP_1)/\partial SP_1=-600/(SP_1)^2$, which is an inverse square power of variable $SP_1$ as shown in FIG. 12 and the negative sign indicates that with the increase in the stock price $SP_1$, less convertible preference shares may be converted.

For the second fiscal year, the end of year is Jun. 30, 2011, i=2, one has:

$E_2$=$600M, $\Delta E_2$=$300M, $N_t$=113.33M shares, $PE_2$=50 ($/share), $C_0$=2, $SP_2$=$PE_2$×total earning/total shares=$PE_2 \times E_2/N_t$=50× $600M/113.33M=$265, which is given in the 6$^{th}$ row of Table III counting from top for i=2 column, $N_{cs}(1)$=$E_1 \times L/SP_1$=$300M×10/$45=66.67M (shares), which is corresponding to the $300M contributed by a plurality of seller companies in the first fiscal year, $N_{cs}(2)$=$E_2 \times L/SP_1$=$600M×10/$265=22.64M (shares), which is corresponding to the $600M contributed by a plurality of seller companies including possible new seller companies in addition to the last year's seller companies, $\alpha_1$=0.2, $\alpha_2$=0.15, $N_{cs}(1) \times \alpha_2$=66.67M×0.15=10M, $N_{cs}(2) \times \alpha_1$=22.64M×0.20=4.53M, $\Sigma^i_{k=1} N_{cs}(k) \times \alpha_{i+1-k}$=$N_{cs}(1) \times \alpha_2 + N_{cs}(2) \times \alpha_1$=10M+ 4.53M=14.53M, $C_0 \Sigma^i_{k=1} \Delta E_k/SP_i$ (i=2)=$C_0 \Delta E_1/SP_2 + C_0 E_2/SP_2$=2×$300M/ $265+2×$300M/$265=4.52M, and accordingly.

$$N^2_{rs} = \text{Min}(C_0[\Sigma^2_{k=1} \Delta E_k/SP_i], \Sigma^2_{k=1} N_{cs}(k) \times \alpha_{2+1-k}) = \text{Min}(4.52M, 14.53M) = 4.52M,$$

which is listed in the second row of Table III counting from bottom for i=2 column. Therefore, at the end of the second fiscal year, there are 4.52M ordinary shares of the business entity 318 are converted from the total number of 133.34M convertible preference shares and delivered to the plurality of seller companies, which can be done by physical delivery and/or electronically delivery. Thus, now the total number of ordinary shares of business entity 318 in the capital market after the end of the second fiscal year is $N_t$=113.33M shares+ new converted shares=113.33M shares+$N^2_{rs}$=113.33M+ 4.52M=117.85M shares.

Similar calculations can be done for i=3, 4, . . . , 10. In practice the present invention, these calculations and delivery of ordinary shares electronically after the calculations are executed by the computer server 426 with its associated infrastructure.

A Second Business Entity

In practicing the method(s) according to various embodiments f the present invention as set forth above, certain logic rules may be agreed upon by the business entity 318 and the registered seller companies and corresponding registered buyer companies, and then implemented by the computer server 426 with its associated infrastructure.

For examples, if at the first fiscal year, i=1, $E_1$=$300M is generated by a plurality of seller companies, and at the second fiscal year, i=2, $E_2$=$200M, $\Delta E_2$=-$100M, which indicates that there is no growth of the operating profits for the plurality of seller companies for the second fiscal year. Thus, there should be no number $N_{cs}$ of convertible preference shares is issued to the plurality of seller companies at the second fiscal year. Accordingly, in general, a rule is implemented by the computer server 426 that if $\Delta E_i$ is smaller than zero, no number $N_{cs}$ of convertible preference shares is issued to the plurality of seller companies at the ith year.

Furthermore, still using the example set forth immediately above, if at the first fiscal year, i=1, $E_1$=$300M is generated by a plurality of seller companies and it is expected that the plurality of seller companies would continue to generate $300M for the coming {i=2, 3, . . . , L} fiscal years, for which expectation a number $N_{cs}$ of convertible preference shares has been issued to the plurality of seller companies in the first fiscal year (e.g., $N_{cs}$=66.67M shares in Table I of FIG. 13 as discussed above), but at the second fiscal year, i=2, $E_2$=$200M is generated by the plurality of seller companies, which is less than the expected annual operating profits of $300M. Although the plurality of seller company may have up to 10M convertible preference shares that may be converted at the end of the second fiscal year, none of them will be converted because the plurality of seller companies does not meet the expected threshold of annual operating profits, here $300M. Accordingly, in general, another rule is implemented by the computer server 426 that if $E_i$ is below a predetermined threshold, no number $N^i_{rs}$ of convertible preference shares is converted to ordinary shares of the business entity at the end of the ith fiscal year by the plurality of seller companies.

Moreover, the rights and interests to the not converted $N0^i_{cs}$ number of convertible preference shares at the end of the ith fiscal year by the plurality of seller companies, which satisfies the following relationship:

$$N0^i_{cs} = \Sigma^i_{k=1} N_{cs}(k) \times \alpha_{i+1-k} - C_0[\Sigma^i_{k=1} \Delta E_k/SP_i],$$

are forfeited by the plurality of seller companies. In the example discussed above where at the second fiscal year, i=2, $E_2$=$200M, the forfeited number $N0^2_{cs}$ of convertible preference shares at the end of the second fiscal year by the plurality of seller companies is given by $$N0^2_{cs} = \Sigma^2_{k=1} N_{cs}(k) \times \alpha_{2+1-k} - C_0[\Sigma^2_{k=1} \Delta E_k/SP_2]$$

$$= (N_{cs}(1) \times \alpha_2 + N_{cs}(2) \times \alpha_1) - 2 \times (\Delta E_1/SP_2 + \Delta E_2/SP_2)$$

$$= 14.53M - 4.52M$$

$$= 10.01M$$

where data from Table III of FIG. 15 have been used.

In one embodiment of the present invention, referring now to FIG. 3, a second business entity 320 can be optionally utilized as an intermediary between business entity 318 and seller company or companies 322. In this embodiment, the second business entity 320 manages the issuing of convertible preference shares("cps") to seller company, which may be governed by a first agreement between the business entity 318 and the second business entity 320, and converting a number of convertible preferred shares to a number of ordinary shares of business entity 318 to seller company with certain financial terms ("FT") in procedure 321, which may be governed by a second agreement between the seller company and the second business entity 320. The second agreement normally has terms different than that of the first agreement. The second agreement may contain certain financial terms and rules as discussed above. Moreover, the not converted number of convertible preference shares of the business entity 318 for any given predetermined time period $t_1$ by the plurality of seller companies can be vested in the second business entity 320. The second business entity 320 may also offer to purchase back the convertible preference shares of the business entity 318 from the plurality of seller companies at the par value of the convertible preference shares according to an arrangement between the second business entity 320 and the business entity 318, and possibly the second agreement between the second business entity 320 and the plurality of seller companies.

While in the above examples, a fiscal year is used as a predetermined time period, or a first predetermined time period, which can be one of a year, a fiscal year, a half year, a half fiscal year, a quarter, a fiscal quarter, a month, and a fiscal month.

Moreover, while in the above examples, a pooling of operating profits from a plurality of seller companies is illustrated, the present invention can be practiced by counting each individual seller company, both of which the computer server 426 with its associated infrastructure is implemented to execute.

It is further noted that unlike most of other e-commerce marketplaces, the inventive e-commerce platform, among other things, has several unique features: first, the inventive e-commerce platform is a rather "completely closed" platform that only opens to SMEs that register with the platform and pass the strict market entry auditing process. Second, there is a dedicated virtual channel to connect a registered buyer with a corresponding registered seller/supplier. And thirdly, the platform interacts with both registered buyers and registered suppliers as a market maker. Accordingly, the platform allows registered buyers and registered suppliers to safely move their transactions from offline to online with efficiencies previously unforeseen but at the same time, it keeps all sensitive trade information, such as invoices, contracts, etc, in a confidential database of the platform, which saves the cost for SMEs as they do not need to implement their own e-commerce portal.

Accordingly, the present invention, in one aspect, relates to a method for using an internet accessible computer system to conduct business to business operations among a plurality of buyer companies and a plurality of seller companies. In one embodiment, the method includes the steps of registering each of the plurality of seller companies with an internet accessible computer system, wherein each of the plurality of seller companies sells goods to a corresponding one of the plurality of seller companies, and the corresponding one buyer company makes payment for the goods sold by that seller company, and registering each of the plurality of buyer companies with the internet accessible computer system, wherein the registration of each of the plurality of buyer companies depends on the registration of its corresponding seller company.

The method further includes the step of issuing by a business entity in control of the internet accessible computer system at the beginning of a fiscal year, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$ according to the following formula:

$$N_{cs} = (PAE \times L)/SP_0,$$

wherein the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$.

Moreover, the method includes the steps of receiving cash or cash equivalents payments by the business entity from the plurality of buyer companies, wherein the cash or cash equivalents payment are made by the plurality of buyer companies for goods sold by the plurality of corresponding seller companies to the plurality of buyer companies, respectively;

making book entries on a computer server for the cash or cash equivalents payments received and storing corresponding records of the book entries in a database coupled with the computer server;

aggregating in every fiscal year over the period of time T by the computer server all the cash or cash equivalents payments received from the plurality of buyer companies into a first amount, $\{M_{1i}, i=1, \ldots, L\}$;

making cash or cash equivalents payments by the business entity to the plurality of seller companies aggregated in a second amount, $\{M_{2i}, i=1, \ldots, L\}$, in every fiscal year over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i,$$

wherein $E_i$ is the after-tax earning that the plurality of seller companies would make from the sales of the goods to the plurality of corresponding buyer companies over the ith fiscal year; and making book entries on the computer server for all the cash or cash equivalents payments made and storing corresponding records of the book entries in the database coupled with the computer server.

The method additionally includes the steps of retaining $\{E_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating by the computer server a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1} \alpha_i \leq 1$, and the number of ordinary shares of the business entity over the period of time T converted from $N_{cs}$ convertible preference shares issued to the plurality of seller companies is no greater than the maximum number $N_{rs}$;

calculating by the computer server the earning growth, $\Delta E_i$, of the ith year from the immediate prior year, the (i−1)th year, by the following formula:

$$\Delta E_i = E_i - E_{i-1};$$

calculating by the computer server a function $N^i_{rs}(\Delta E_i, SP_i)$ that satisfies the following conditions:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

wherein $SP_i$ is the market stock price per share for the ordinary shares of the business entity averaged over a predetermined time period around time of the ith year;

calculating by the computer server, $N^i_{rs}$, the total number of ordinary shares of the business entity converted for the ith year for the plurality of seller companies from the following relationship:

$$N^i_{rs} = \text{Min}(N^i_{rs}(\Delta E_i, SP_i), \Sigma^i_{k=1} N_{cs}(k) \times \alpha_{i+1-k}); \text{ and}$$

delivering $N^i_{rs}$ ordinary shares of the business entity of the ith year to the plurality of seller companies.

In one embodiment, $N^i_{rs}(\Delta E_i, SP_i)$ is in the form of $$N^i_{rs}(\Delta E_i, SP_i) = C_0[\Sigma^i_{k=1} \Delta E_k/SP_i],$$

wherein $C_0$ is a predetermined constant, and $N^i_{rs}$ is calculated from the following relationship:

$$N^i_{rs}=\text{Min}(C_0[\Sigma^i_{k=1}\Delta E_k/SP_i], \Sigma^i_{k=1}N_{cs}(k)\times\alpha_{i+1-k}).$$

In practicing the method as set forth above, no number $N_{cs}$ of convertible preference shares is issued to the plurality of seller companies at the time of the ith year if $\Delta E_i$ is smaller than zero. Furthermore, no number $N^i_{rs}$ of convertible preference shares is converted to ordinary shares of the business entity at the ith year by the plurality of seller companies if $E_i$ is below a predetermined threshold. The rights and interests to the not converted $N0^i_{cs}$ number of ordinary shares of the business entity at the ith year by the plurality of seller companies, which satisfies the following relationship:

$$N0^i_{cs}=\Sigma^i_{k=1}N_{cs}(k)\times\alpha_{i+1-k}-C_0[\Sigma^i_{k=1}\Delta E_k/SP_i],$$

are forfeited by the plurality of seller companies.

The number $N^i_{rs}$ of convertible preference shares is delivered to the plurality of seller companies according to their contributions to the after-tax earnings $E_1, E_2, \ldots E_i$, respectively.

The present invention, in another aspect, relates to an internet accessible computer system to conduct business to business operations among a plurality of buyer companies and a plurality of seller companies. In one embodiment, the system includes at least one buyer client system; at least one computer server coupled to a database for storing data; and a network connecting said at least one seller client system and said at least one buyer client system to said at least one computer server, wherein said at least one computer server is programmed for:

registering each of the plurality of seller companies with the internet accessible computer system, wherein each of the plurality of seller companies sells goods to a corresponding one of the plurality of buyer companies, and the corresponding one buyer company makes payment for the goods sold by that seller company;

registering each of the plurality of buyer companies with the internet accessible computer system, wherein the registration of each of the plurality of buyer companies depends on the registration of its corresponding seller company;

when a business entity in control of the internet accessible computer system issues, at the beginning of a fiscal year, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$, calculating the number $N_{cs}$ according to the following formula:

$$N_{cs}=(PAE\times L)/SP_0,$$

wherein the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$;

when cash or cash equivalents payments are received by the business entity from the plurality of buyer companies, wherein the cash or cash equivalents payment are made by the plurality of buyer companies for goods sold by the plurality of corresponding seller companies to the plurality of buyer companies, respectively, making book entries on the computer server for all the cash or cash equivalents payments received and storing corresponding records of the book entries in the database;

aggregating in every fiscal year over the period of time T by the computer server all the cash or cash equivalents payments received from the plurality of buyer companies into a first amount, $\{M_{1i}, i=1, \ldots, L\}$;

calculating $E_i$, the after-tax earning that the plurality of seller companies would make from the sales of the goods to the plurality of corresponding buyer companies at the ith fiscal year;

when cash or cash equivalents payments by the business entity are made to the plurality of seller companies, aggregating all the cash or cash equivalents payments made in a second amount, $\{M_{2i}, i=1, \ldots, L\}$, in every fiscal year over the period of time T, wherein $M_{1i}$ and $M_{2i}$ satisfy the following relationships:

$$M_{2i}<M_{1i}, \text{ and}$$

$$(M_{1i}-M_{2i})\times(1-R_{tax})=E_i;$$

making book entries on the computer server for all the cash or cash equivalents payments made and storing corresponding records of the book entries in the database;

retaining $\{E_i, i=1, \ldots, L\}$ as the cash flow for the business entity to back the ordinary shares of the business entity publicly traded in the capital market; making book entries on the computer server for all the cash flow retained and storing corresponding records of the book entries in the database;

calculating a maximum number $N_{rs}$, which is determined by the following formula:

$$N_{rs}=\Sigma^L_{i=1}N_{cs}(i)\times\alpha_i,$$

where $\{\alpha_i\}$ satisfy the condition of $\Sigma^L_{i=1}\alpha_i\leq 1$, and the number of ordinary shares of the business entity over the period of time T converted from $N_{cs}$ convertible preference shares issued to the plurality of seller companies is no greater than the maximum number $N_{rs}$;

calculating the earning growth, $\Delta E_i$, of the ith year from the immediate prior year, the (i−1)th year, by the following formula:

$$\Delta E_i=E_i-E_{i-1};$$

calculating by the computer server a function $N^i_{rs}(\Delta E_i, SP_i)$ that satisfies the following conditions:

$$\partial N^i_{rs}(\Delta E_i, SP_i)/\partial\Delta E_i\geq 0, \text{ and}$$

$$\partial N^i_{rs}(\Delta E_i, SP_i)/\partial SP_i\leq 0,$$

wherein $SP_i$ is the market stock price per share for the ordinary shares of the business entity averaged over a predetermined time period around time of the ith year;

calculating by the computer server, $N^i_{rs}$, the total number of ordinary shares of the business entity converted for the ith year for the plurality of seller companies from the following relationship:

$$N^i_{rs}=\text{Min}(N^i_{rs}(\Delta E_i, SP_i), \Sigma^i_{k=1}N_{cs}(k)\times\alpha_{i+1-k}); \text{ and}$$

when $N^i_{rs}$ ordinary shares of the business entity of the ith year are delivered to the plurality of seller companies, making book entries on the computer server for the delivered $N^i_{rs}$ ordinary shares of the business entity and storing corresponding records of the book entries in the database.

In one embodiment, $N^i_{rs}(\Delta E_i, SP_i)$ is in the form of $$N^i_{rs}(\Delta E_i, SP_i) = C_0[\Sigma^i_{k=1}\Delta E_k/SP_i],$$

wherein $C_0$ is a predetermined constant, and said at least one computer server is programmed for calculating $N^i_{rs}$ from the following relationship:

$$N^i_{rs} = \text{Min}(C_0[\Sigma^i_{k=1}\Delta E_k/SP_i], \Sigma^i_{k=1}N_{cs}(k)\times\alpha_{i+1-k}).$$

The present invention, in a further aspect, relates to a method for using an internet accessible computer system to conduct business to business operations among a plurality of buyer companies and a plurality of seller companies. In one embodiment, the method includes the steps of registering each of the plurality of seller companies with an internet accessible computer system, wherein each of the plurality of seller companies sells goods to a corresponding one of the plurality of buyer companies, and the corresponding one buyer company makes payment for the goods sold by that seller company; and registering each of the plurality of buyer companies with the internet accessible computer system, wherein the registration of each of the plurality of buyer companies depends on the registration of its corresponding seller company.

The method further includes the step of issuing by a business entity in control of the internet accessible computer system at the beginning of a first predetermined time period $t_1$, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$ according to the following formula:

$$N_{cs} = (PAE \times L)/SP_0,$$

wherein the ordinary shares of the business entity are publicly traded in a capital market, the period of time T is divided into a predetermined number L of the first predetermined time period $t_1$ such that $T = L \times t_1$, PAE is the projected annual after-tax earning that the plurality of seller companies would make from the sales of the goods to the plurality of buyer companies over the period of time T, and $SP_0$ is the stock price per share for the ordinary shares of the business entity averaged over a second predetermined time period $t_2$ around time $T_0$.

Moreover, the method includes the steps of receiving cash or cash equivalents payments by the business entity from the plurality of buyer companies, wherein the cash or cash equivalents payment are made by the plurality of buyer companies for goods sold by the plurality of corresponding seller companies to the plurality of buyer companies, respectively;

aggregating in every first predetermined time period $t_1$ over the period of time T by a computer server all the cash or cash equivalents payments received from the plurality of buyer companies into a first amount, $\{M_{1i}, i=1, \ldots, L\}$;

making cash or cash equivalents payments by the business entity to the plurality of seller companies aggregated in a second amount, $\{M_{2i}, i=1, \ldots, L\}$, in every first predetermined time period $t_1$ over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i,$$

wherein $E_i$ is the after-tax earning that the plurality of seller companies would make from the sales of the goods to the plurality of corresponding buyer companies over the ith first predetermined time period $t_1$; and converting a number of $N_{cs}$ convertible preference shares issued to the plurality of seller companies to a number of ordinary shares of the business entity over the period of time T no greater than a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1}\alpha_i \leq 1$.

The method further includes the steps of calculating by the computer server the earning growth, $\Delta E_i$, of the ith first predetermined time period $t_1$ from the immediate first predetermined time period $t_1$, the (i-1)th first predetermined time period $t_1$, by the following formula:

$$\Delta E_i = E_i - E_{i-1}; \text{ and}$$

completing the issuance and delivery of $N^i_{rs}$ ordinary shares of the business entity at the ith first predetermined time period $t_1$ to the plurality of seller companies according to a function $N^i_{rs}(\Delta E_i, SP_i)$ that satisfies the following conditions:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

wherein $SP_i$ is the market stock price per share for the ordinary shares of the business entity averaged over a predetermined time period around time of the ith first predetermined time period $t_1$, and $N^i_{rs}$ is the total number of ordinary shares of the business entity converted at the ith first predetermined time period $t_1$ by the plurality of seller companies.

The method of claim 10, wherein $N^i_{rs}(\Delta E_i, SP_i)$ is in the form of $$N^i_{rs}(\Delta E_i, SP_i) = C_0[\Sigma^i_{k=1}\Delta E_k/SP_i],$$

wherein $C_0$ is a predetermined constant.

In one embodiment, the number $N^i_{rs}$ of convertible preference shares that is converted and delivered to the plurality of seller companies for the ith first predetermined time period $t_1$ is predetermined by the following relationship:

$$N^i_{rs} = \text{Min}(C_0[\Sigma^i_{k=1}\Delta E_k/SP_i], \Sigma^i_{k=1}N_{cs}(k)\times\alpha_{i+1-k}).$$

In practicing the method as set forth above in this aspect of the present invention, in one embodiment, no number $N_{cs}$ of convertible preference shares is issued to the plurality of seller companies for the ith first predetermined time period $t_1$ if $\Delta E_i$ is smaller than zero. Moreover, no number $N^i_{rs}$ of convertible preference shares is converted to ordinary shares of the business entity for the ith first predetermined time period $t_1$ by the plurality of seller companies if $E_i$ is below a predetermined threshold. The rights and interests to the not converted $N0^i_{cs}$ number of ordinary shares of the business entity for the ith first predetermined time period $t_1$ by the plurality of seller companies, which satisfies the following relationship:

$$N0^i_{cs} = \Sigma^i_{k=1}N_{cs}(k)\times\alpha_{i+1-k} - C_0[\Sigma^i_{k=1}\Delta E_k/SP_i],$$

are forfeited by the plurality of seller companies.

In one embodiment, the not converted $N0^i_{cs}$ number of ordinary shares of the business entity for the ith first predetermined time period $t_1$ by the plurality of seller companies is vested in a second business entity, wherein the second business entity is an intermediary between the business entity and the plurality of seller companies. The relationship of the second business entity and the business entity is defined by a first agreement, and the relationship of the second business entity and the plurality of seller companies is defined by a second agreement that has terms different than that of the first agreement.

The first predetermined time period $t_1$ is one of a year, a fiscal year, a half year, a half fiscal year, a quarter, a fiscal quarter, a month, and a fiscal month.

The number $N^i_{rs}$ of convertible preference shares is delivered to the plurality of seller companies according to their contributions to the after-tax earnings $E_1, E_2, \ldots E_i$, respectively.

The present invention, in a yet another aspect, relates to an internet accessible computer system to conduct business to business operations among a plurality of buyer companies and a plurality of seller companies. In one embodiment, the system includes
- at least one seller client system;
- at least one buyer client system;
- at least one computer server coupled to a database for storing data; and a network connecting said at least one seller client system and said at least one buyer client system to said at least one computer server, wherein said at least one computer server is programmed for:
- registering each of the plurality of seller companies with the internet accessible computer system, wherein each of the plurality of seller companies sells goods to a corresponding one of the plurality of buyer companies, and the corresponding one buyer company makes payment for the goods sold by that seller company;
- registering each of the plurality of buyer companies with the internet accessible computer system, wherein the registration of each of the plurality of buyer companies depends on the registration of its corresponding seller company;
- when a business entity in control of the internet accessible computer system issues, at the beginning of a first predetermined time period $t_1$, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$, calculating the number $N_{cs}$ according to the following formula:

$$N_{cs} = (PAE \times L)/SP_0,$$

wherein the ordinary shares of the business entity are publicly traded in a capital market, the period of time T is divided into a predetermined number L of the first predetermined time period $t_1$ such that $T = L \times t_1$, PAE is the projected annual after-tax earning that the plurality of seller companies would make from the sales of the goods to the plurality of buyer companies over the period of time T, and $SP_0$ is the stock price per share for the ordinary shares of the business entity averaged over a second predetermined time period $t_2$ around time $T_0$;

when cash or cash equivalents payments are received by the business entity from the plurality of buyer companies, wherein the cash or cash equivalents payment are made by the plurality of buyer companies for goods sold by the plurality of corresponding seller companies to the plurality of buyer companies, respectively, making book entries on the computer server for all the cash or cash equivalents payments received and storing corresponding records of the book entries in the database;

aggregating in every first predetermined time period $t_1$ over the period of time T by the computer server all the cash or cash equivalents payments received from the plurality of buyer companies into a first amount, $\{M_{1i}, i=1, \ldots, L\}$;

calculating $E_i$, the after-tax earning that the plurality of seller companies would make from the sales of the goods to the plurality of corresponding buyer companies over the ith first predetermined time period $t_1$;

when cash or cash equivalents payments are made by the business entity to the plurality of seller companies, aggregating all the cash or cash equivalents made in a second amount, $\{M_{2i}, i=1, \ldots, L\}$, in every first predetermined time period $t_1$ over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i;$$

making book entries on the computer server for all the cash or cash equivalents payments made and storing corresponding records of the book entries in the database;

calculating a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1} \alpha_i \leq 1$, and the number of $N_{cs}$ convertible preference shares issued to the plurality of seller companies converted to a number of ordinary shares of the business entity over the period of time T is no greater than the maximum number $N_{rs}$; and when a number of ordinary shares of the business entity is delivered to the plurality of seller companies, making book entries on the computer server for the delivered ordinary shares of the business entity and storing corresponding records of the book entries in the database.

Said at least one computer server is further programmed for:
retaining $\{E_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating the earning growth, $\Delta E_i$, of the ith first predetermined time period $t_1$ from the immediate prior year, the (i−1)th year, by the following formula:

$$\Delta E_i = E_i - E_{i-1};$$

calculating by the computer server a function $N^i_{rs}(\Delta E_i, SP_i)$ that satisfies the following conditions:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

wherein $SP_i$ is the market stock price per share for the ordinary shares of the business entity averaged over a predetermined time period around time of the ith first predetermined time period $t_1$;

calculating by the computer server, $N^i_{rs}$, the total number of ordinary shares of the business entity converted for the ith first predetermined time period $t_1$ for the plurality of seller companies from the following relationship:

$$N^i_{rs} = \text{Min}(N^i_{rs}(\Delta E_i, SP_i), \Sigma^i_{k=1} N_{cs}(k) \times \alpha_{i+1-k}); \text{ and}$$

when $N^i_{rs}$ ordinary shares of the business entity of the ith first predetermined time period $t_1$ are delivered to the plurality of seller companies, making book entries on the computer server for the delivered $N^i_{rs}$ ordinary shares of the business entity and storing corresponding records of the book entries in the database.

In one embodiment, $N^i_{rs}(\Delta E_i, SP_i)$ is in the form of $$N^i_{rs}(\Delta E_i, SP_i) = C_0[\Sigma^i_{k=1} \Delta E_k/SP_i],$$

wherein $C_0$ is a predetermined constant. The number of $N^i_{rs}$ of convertible preference shares that is converted and delivered to the plurality of seller companies for the ith first predetermined time period $t_1$ is determined by the following relationship:

$$N^i_{rs} = \text{Min}(C_0[\Sigma^i_{k=1} \Delta E_k/SP_i], \Sigma^i_{k=1} N_{cs}(k) \times \alpha_{i+1-k}).$$

Moreover, said at least one computer server is further programmed for registering each of the plurality of seller companies with the internet accessible computer system in the steps of:
  providing a registration form to one of the plurality of seller companies for collecting certain information;
  receiving the filled registration form said seller company, wherein said seller company identifies a corresponding buyer company to which said seller company sells goods and receives payments for the goods sold;
  auditing said seller company based on the collected information against a set of first predetermined conditions;
  authenticating said seller company if said seller company passes the auditing step;
  creating a unique identifier (UID) and a user account; and
  notifying said seller company by email.

Additionally, said at least one computer server is further programmed for registering each of the plurality of seller companies with the internet accessible computer system in the steps of:
  notifying said seller company if said seller company fails to pass the auditing step;
  providing said seller company a notification listing why said seller company fails to pass the auditing step; and
  instructing said seller company to resubmit the registration with updated information.

Furthermore, said at least one computer server is further programmed for registering each of the plurality of buyer companies with the internet accessible computer system in the steps of:
  providing a registration form to one of the plurality of buyer companies for collecting certain information;
  receiving the filled registration form said buyer company, wherein said buyer company identifies a corresponding seller company to which said buyer company receives goods and makes payments for the goods received;
  checking whether said corresponding seller company has successfully registered with the internet accessible computer system and identified said buyer company in said corresponding seller company's registration form;
  if the step of checking is positive, then auditing said buyer company based on the collected information against a set of second predetermined conditions;
  authenticating said buyer company if said buyer company passes the auditing step;
  creating a unique identifier (UID) and a user account;
  notifying said buyer company by email; and
  notifying said seller company by email that said buyer company has successfully registered with the internet accessible computer system.

Furthermore, said at least one computer server is programmed for registering each of the plurality of buyer companies with the internet accessible computer system in the steps of:
  notifying said buyer company if the step of checking is negative; and
  instructing said buyer company to resubmit the registration with updated information.

Said at least one computer server is further programmed for registering each of the plurality of buyer companies with the internet accessible computer system in the steps of:
  notifying said buyer company if said buyer company fails to pass the auditing step;
  providing said buyer company a notification listing why said buyer company fails to pass the auditing step; and
  instructing said buyer company to resubmit the registration with updated information.

The first predetermined time period $t_1$ is one of a year, a fiscal year, a half year, a half fiscal year, a quarter, a fiscal quarter, a month, and a fiscal month.

The present invention, in a further aspect, relates to a computer-readable medium storing instructions which, when executed by a processor, cause an internet accessible computer system to perform a method for conducting business to business operations among a plurality of buyer companies and a plurality of seller companies.

In one embodiment, the method comprises the steps of:
  registering each of the plurality of seller companies with the internet accessible computer system, wherein each of the plurality of seller companies sells goods to a corresponding one of the plurality of buyer companies, and the corresponding one buyer company makes payment for the goods sold by that seller company;
  registering each of the plurality of buyer companies with the internet accessible computer system, wherein the registration of each of the plurality of buyer companies depends on the registration of its corresponding seller company;
  when a business entity in control of the internet accessible computer system issues, at the beginning of a first predetermined time period $t_1$, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$, calculating the number $N_{cs}$ according to the following formula:

$$N_{cs} = (PAE \times L)/SP_0,$$

wherein the ordinary shares of the business entity are publicly traded in a capital market, the period of time T is divided into a predetermined number L of the first predetermined time period $t_1$ such that $T = L \times t_1$, PAE is the projected annual after-tax earning that the plurality of seller companies would make from the sales of the goods to the plurality of buyer companies over the period of time T, and $SP_0$ is the stock price per share for the ordinary shares of the business entity averaged over a second predetermined time period $t_2$ around time $T_0$;
  when cash or cash equivalents payments are received by the business entity from the plurality of buyer companies, wherein the cash or cash equivalents payment are made by the plurality of buyer companies for goods sold by the plurality of corresponding seller companies to the plurality of buyer companies, respectively, making book entries on the computer server for all the cash or cash equivalents payments received and storing corresponding records of the book entries in the database;
  aggregating in every first predetermined time period $t_1$ over the period of time T by the computer server all the cash or cash equivalents payments received from the plurality of buyer companies into a first amount, $\{M_{1i}, i=1, \ldots, L\}$;

calculating $E_i$, the after-tax earning that the plurality of seller companies would make from the sales of the goods to the plurality of corresponding buyer companies for the ith first predetermined time period $t_1$;

when cash or cash equivalents payments are made by the business entity to the plurality of seller companies, aggregating all the cash or cash equivalents payments made in a second amount, $\{M_{2i}, i=1, \ldots, L\}$, in every first predetermined time period $t_1$ over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i;$$

making book entries on the computer server for all the cash or cash equivalents payments made and storing corresponding records of the book entries in the database;

calculating a maximum number $N_{rs}$, which is determined by the following formula:

$$N_{rs} = \Sigma_{i=1}^{L} N_{cs}(i) \times \alpha_i,$$

where $\{\alpha_i\}$ satisfy the condition of $\Sigma_{i=1}^{L} \alpha_i \leq 1$, and the number of $N_{cs}$ convertible preference shares issued to the plurality of seller companies converted to a number of ordinary shares of the business entity over the period of time T is no greater than the maximum number $N_{rs}$; and when a number of ordinary shares of the business entity is delivered to the plurality of seller companies, making book entries on the computer server for the delivered ordinary shares of the business entity and storing corresponding records of the book entries in the database.

The method further comprises the steps of:

retaining $\{E_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating the earning growth, $\Delta E_i$, for the ith first predetermined time period $t_1$ from the immediate prior year, the (i−1)th first predetermined time period $t_1$, by the following formula:

$$\Delta E_i = E_i - E_{i-1};$$

calculating by the computer server a function $N^i_{rs}(\Delta E_i, SP_i)$ that satisfies the following conditions:

$$\partial N^i_{rs}(\Delta E_i, SP_i)/\partial \Delta E_i \geq 0,$$

$$\partial N^i_{rs}(\Delta E_i, SP_i)/\partial SP_i \leq 0, \text{ and}$$

when i=1, $SP_1 = SP_0$, wherein $SP_i$ is the market stock price per share for the ordinary shares of the business entity averaged over a predetermined time period around time of the ith first predetermined time period $t_1$;

calculating by the computer server, $N^i_{rs}$, the total number of ordinary shares of the business entity converted at the ith first predetermined time period $t_1$ for the plurality of seller companies from the following relationship:

$$N^i_{rs} = \mathrm{Min}(N^i_{rs}(\Delta E_i, SP_i), \Sigma^i_{k=1} N_{cs}(k) \times \alpha_{i+1-k}); \text{ and}$$

when $N^i_{rs}$ ordinary shares of the business entity at the ith first predetermined time period $t_1$ are delivered to the plurality of seller companies, making book entries on the computer server for the delivered $N^i_{rs}$ ordinary shares of the business entity and storing corresponding records of the book entries in the database.

In one embodiment, the method further comprises the steps of:

providing a registration form to one of the plurality of seller companies for collecting certain information;

receiving the filled registration form said seller company, wherein said seller company identifies a corresponding buyer company to which said seller company sells goods and receives payments for the goods sold;

auditing said seller company based on the collected information against a set of first predetermined conditions;

authenticating said seller company if said seller company passes the auditing step;

creating a unique identifier (UID) and a user account; and notifying said seller company by email.

In one embodiment, the method further comprises the steps of:

notifying said seller company if said seller company fails to pass the auditing step;

providing said seller company a notification listing why said seller company fails to pass the auditing step; and instructing said seller company to resubmit the registration with updated information.

In one embodiment, the method further comprises the steps of:

providing a registration form to one of the plurality of buyer companies for collecting certain information;

receiving the filled registration form said buyer company, wherein said buyer company identifies a corresponding seller company to which said buyer company receives goods and makes payments for the goods received;

checking whether said corresponding seller company has successfully registered with the internet accessible computer system and identified said buyer company in said corresponding seller company's registration form;

if the step of checking is positive, then auditing said buyer company based on the collected information against a set of second predetermined conditions;

authenticating said buyer company if said buyer company passes the auditing step;

creating a unique identifier (UID) and a user account;

notifying said buyer company by email; and notifying said seller company by email that said buyer company has successfully registered with the internet accessible computer system.

In one embodiment, the method further comprises the steps of:

notifying said buyer company if the step of checking is negative; and instructing said buyer company to resubmit the registration with updated information.

In one embodiment, the method further comprises the steps of:

notifying said buyer company if said buyer company fails to pass the auditing step;

providing said buyer company a notification listing why said buyer company fails to pass the auditing step; and instructing said buyer company to resubmit the registration with updated information.

In one embodiment, $N^i_{rs}(\Delta E_i, SP_i)$ is in the form of $$N^i_{rs}(\Delta E_i, SP_i) = C_0[\Sigma^i_{k=1} \Delta E_k/SP_i],$$

wherein $C_0$ is a predetermined constant. The number of $N^i_{rs}$ of convertible preference shares that is converted and delivered to the plurality of seller companies for the ith first predetermined time period $t_1$ is determined by the following relationship:

$$N^i_{rs} = \text{Min}(C_0[\Sigma^i_{k=1}\Delta E_k/SP_i], \Sigma^i_{k=1}N_{cs}(k)\times\alpha_{i+1-k}).$$

The present invention, in another aspect, relates to a computer-readable medium storing instructions which, when executed by a processor, cause an internet accessible computer system to perform a method for conducting business to business operations among a plurality of buyer companies and a plurality of seller companies.

In one embodiment, the method comprises the steps of:

registering each of the plurality of seller companies with the internet accessible computer system, wherein each of the plurality of seller companies sells goods to a corresponding one of the plurality of buyer companies, and the corresponding one buyer company makes payment for the goods sold by that seller company;

registering each of the plurality of buyer companies with the internet accessible computer system, wherein the registration of each of the plurality of buyer companies depends on the registration of its corresponding seller company;

when a business entity in control of the internet accessible computer system issues, at the beginning of a fiscal year, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$, calculating the number $N_{cs}$ according to the following formula:

$$N_{cs} = (PAE \times L)/SP_0,$$

wherein the ordinary shares of the business entity are publicly traded in a capital market, the period of time T is divided into a predetermined number L of fiscal years, PAE is the projected annual after-tax earning that the plurality of seller companies would make from the sales of the goods to the plurality of buyer companies over the period of time T, and $SP_0$ is the stock price per share for the ordinary shares of the business entity averaged over a predetermined time period around time $T_0$;

when cash or cash equivalents payments are received by the business entity from the plurality of buyer companies, wherein the cash or cash equivalents payment are made by the plurality of buyer companies for goods sold by the plurality of corresponding seller companies to the plurality of buyer companies, respectively, making book entries on the computer server for all the cash or cash equivalents payments received and storing corresponding records of the book entries in the database;

aggregating in every fiscal year over the period of time T by the computer server all the cash or cash equivalents payments received from the plurality of buyer companies into a first amount, $\{M_{1i}, i=1, \ldots, L\}$;

calculating $E_i$, the after-tax earning that the plurality of seller companies would make from the sales of the goods to the plurality of corresponding buyer companies at the ith fiscal year;

when cash or cash equivalents payments by the business entity are made to the plurality of seller companies, aggregating all the cash or cash equivalents payments made in a second amount, $\{M_{2i}, i=1, \ldots, L\}$, in every fiscal year over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i;$$

making book entries on the computer server for all the cash or cash equivalents payments made and storing corresponding records of the book entries in the database;

retaining $\{E_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating a maximum number $N_{rs}$, which is determined by the following formula:

$$N_{rs} = \Sigma^L_{i=1}N_{cs}(i) \times \alpha_i,$$

where $\{\alpha_i\}$ satisfy the condition of $\Sigma^L_{i=1}\alpha_i \leq 1$, and the number of ordinary shares of the business entity over the period of time T converted from $N_{cs}$ convertible preference shares issued to the plurality of seller companies is no greater than the maximum number $N_{rs}$;

calculating the earning growth, $\Delta E_i$, for the ith year from the immediate prior year, the (i−1)th year, by the following formula:

$$\Delta E_i = E_i - E_{i-1};$$

calculating by the computer server a function $N^i_{rs}(\Delta E_i, SP_i)$ that satisfies the following conditions:

$$\partial N^i_{rs}(\Delta E_i, SP_i)/\partial \Delta E_i \geq 0,$$

$$\partial N^i_{rs}(\Delta E_i, SP_i)/\partial SP_i \leq 0, \text{ and}$$

when $i=1$, $SP_1 = SP_0$, wherein $SP_i$ is the market stock price per share for the ordinary shares of the business entity averaged over a predetermined time period around time of the ith year;

calculating by the computer server, $N^i_{rs}$, the total number of ordinary shares of the business entity converted for the ith year for the plurality of seller companies from the following relationship:

$$N^i_{rs} = \text{Min}(N^i_{rs}(\Delta E_i, SP_i), \Sigma^i_{k=1}N_{cs}(k)\times\alpha_{i+1-k}); \text{ and}$$

when $N^i_{rs}$ ordinary shares of the business entity of the ith year are delivered to the plurality of seller companies, making book entries on the computer server for the delivered $N^i_{rs}$ ordinary shares of the business entity and storing corresponding records of the book entries in the database.

The present invention, in yet another aspect, relates to a method for using an internet accessible computer system to conduct business to business operations among a plurality of buyer companies and a plurality of seller companies. In one embodiment, the method comprises the steps of:

registering a seller company with an internet accessible computer system;

registering a buyer company with the internet accessible computer system, wherein the seller company sells goods to the buyer company, and the buyer company makes payment to the seller company, and wherein the registration of the buyer company depends on the registration of the seller company;

issuing by a business entity in control of the internet accessible computer system at the beginning of a first predetermined time period $t_1$, time $T_0$, a number $n_{cs}$ of convertible preference shares to the seller company, wherein the $n_{cs}$ convertible shares are convertible to $n_{rs}$ ordinary shares of the business entity over a period of time T counting from time $T_0$, according to the following formula:

$$n_{cs} = (pae \times L)/SP_0,$$

wherein the ordinary shares of the business entity are publicly traded in a capital market, the period of time T is divided into a predetermined number L of the first predetermined time period $t_1$ such that $T=L \times t_1$, pae is the projected annual after-tax earning that the seller company would make from the sales of the goods to the buyer company over the period of time T, and $SP_0$ is the stock price per share for the ordinary shares of the business entity averaged over a second predetermined time period $t_2$ around time $T_0$;

receiving cash or cash equivalents payments in a first amount, $m_1$, by the business entity over the first predetermined time period $t_1$, wherein the cash or cash equivalents payment in a first amount is made by the buyer company for goods sold by the seller company to the buyer company;

making a cash or cash equivalents payment in a second amount, $m_2$, by the business entity to the seller company over the first predetermined time period $t_1$, wherein $m_1$ and $m_2$ satisfy the following relationships:

$$m_2 < m_1, \text{ and}$$

$$(m_1 - m_2) \times (1 - R_{tax}) = e_i,$$

wherein $e_i$ is the after-tax earning that the seller company would make from the sales of the goods to the buyer company over the first predetermined time period $t_1$, $i = 1, \ldots, L$;

converting a number of $n_{cs}$ convertible preference shares to the seller company to a number of ordinary shares of the business entity over a period of time T no greater than a maximum number $n_{rs}$, which is determined by the following formula:

$$n_{rs} = \Sigma^L_{i=1} n^i_{rs} = n^1_{rs} + n^2_{rs} + \ldots + n^L_{rs}, \text{ and}$$

$$n^i_{rs} = n_{cs} \times \alpha_i,$$

wherein $\alpha_i$ is a predetermined converting ratio for the ith first predetermined time period $t_1$, and $\{\alpha_i\}$ satisfy the condition of $\Sigma^L_{i=1} \alpha_i = 1$.

In one embodiment, the method further comprises the steps of calculating the earning growth, $\Delta e_i$, for the ith first predetermined time period $t_1$ from the immediate prior year, the (i−1)th first predetermined time period $t_1$ by the following formula:

$$\Delta e_i = e_i - e_{i-1}; \text{ and}$$

completing the issuance and delivery of $n^i_{rs}$ ordinary shares of the business entity for the ith first predetermined time period $t_1$ to the seller company according to a function $n^i_{rs}(\Delta e_i, SP_i)$ that satisfies:

$$\partial n^i_{rs}(\Delta e_i, SP_i)/\partial \Delta e_i \geq 0, \text{ and}$$

$$\partial n^i_{rs}(\Delta e_i, SP_i)/\partial SP_i \leq 0,$$

wherein $SP_i$ is the market stock price per share for the ordinary shares of the business entity averaged over a predetermined time period around time of the ith first predetermined time period $t_1$.

In one embodiment, $n^i_{rs}(\Delta e_i, SP_i)$ is in the form of $$n^i_{rs}(\Delta e_i, SP_i) = C_0[\Sigma^i_{k=1} \Delta e_k/SP_1],$$

wherein $C_0$ is a predetermined constant. The number $n^i_{rs}$ of convertible preference shares is issued and delivered to the seller company for the ith first predetermined time period $t_1$ is determined by the following relationship:

$$Min(C_0[\Sigma^i_{k=1} \Delta e_k/SP_k], \Sigma^i_{k=1} n^k_{cs}(k) \times \alpha_{i+1-k}).$$

In practicing the method set forth above, in one embodiment, no number $n_{cs}$ of convertible preference shares is issued to the seller company for the ith first predetermined time period $t_1$ if the $\Delta e_i$ is smaller than zero. Moreover, no $n^i_{rs}$ number of convertible preference shares is converted to ordinary shares of the business entity for the ith first predetermined time period $t_1$ by the seller company if the $e_i$ is below a predetermined threshold. The rights and interests to the not converted $no^i_{cs}$ number of ordinary shares of the business entity for the ith first predetermined time period $t_1$ by the seller company, which satisfies the following relationship:

$$no^i_{cs} = \Sigma^i_{k=1} n^k_{cs} \times \alpha_{i+1-k} - C_0[\Sigma^i_{k=1} \Delta ae_k/SP_i],$$

are forfeited by the seller company.

The first predetermined time period $t_1$ is one of a year, a fiscal year, a half year, a half fiscal year, a quarter, a fiscal quarter, a month, and a fiscal month.

The present invention, in yet another aspect, relates to an internet accessible computer system to conduct business to business operations among a plurality of buyer companies and a plurality of seller companies. In one embodiment, the system includes at least one buyer client system; at least one computer server coupled to a database for storing data; and a network connecting said at least one seller client system and said at least one buyer client system to said at least one computer server, wherein said at least one computer server is programmed for:

registering a seller company with the internet accessible computer system;

registering a buyer company with the internet accessible computer system, wherein the seller company sells goods to the buyer company, and the buyer company makes payment to the seller company, and wherein the registration of the buyer company depends on the registration of the seller company;

when a business entity in control of the internet accessible computer system issues, at the beginning of a first predetermined time period $t_1$, time $T_0$, a number $n_{cs}$ of convertible preference shares to the seller company, wherein the $n_{cs}$ convertible shares are convertible to $n_{rs}$ ordinary shares of the business entity over a period of time T counting from time $T_0$, calculating the number $n_{cs}$ according to the following formula:

$$n_{cs} = (pae \times L)/SP_0,$$

wherein the ordinary shares of the business entity are publicly traded in a capital market, the period of time T is divided into a predetermined number L of the first predetermined time period $t_1$ such that $T = L \times t_1$, pae is the projected annual after-tax earning that the seller company would make from the sales of the goods to the buyer company over the period of time T, and $SP_0$ is the stock price per share for the ordinary shares of the business entity averaged over a second predetermined time period $t_2$ around time $T_0$;

when cash or cash equivalents payments are received by the business entity from the buyer company, wherein the cash or cash equivalents payment are made by the buyer company for goods sold by the seller company to the buyer company, making book entries on the computer server for all the cash or cash equivalents payments received and storing corresponding records of the book entries in the database;

aggregating in every first predetermined time period $t_1$ over the period of time T by the computer server all the cash or cash equivalents payments received from the buyer company into a first amount, $\{m_{1i}, i=1, \ldots, L\}$;

calculating $e_i$, the after-tax earning that the seller company would make from the sales of the goods to the buyer company at the ith first predetermined time period $t_1$;

when cash or cash equivalents payments are made by the business entity to the seller company, aggregating all the cash or cash equivalents made in a second amount, $\{m_{2i}, i=1, \ldots, L\}$, in every first predetermined time period $t_1$ over the period of time T, wherein $m_{1i}$ and $m_{2i}$ satisfy the following relationships:

$$m_{2i} < m_{1i}, \text{ and}$$

$$(m_{1i} - m_{2i}) \times (1 - R_{tax}) = e_i;$$

making book entries on the computer server for all the cash or cash equivalents payments made and storing corresponding records of the book entries in the database;

calculating a maximum number $n_{rs}$, which is determined by the following formula:

$$n_{rs} = \Sigma^L_{i=1} n_{cs} \times \alpha_i,$$

where $\{\alpha_i\}$ satisfy the condition of $\Sigma^L_{i=1} \alpha_i \leq 1$, and the number of $n_{cs}$ convertible preference shares issued to the seller company converted to a number of ordinary shares of the business entity over the period of time T is no greater than the maximum number $n_{rs}$; and when a number of ordinary shares of the business entity is delivered to the plurality of seller companies, making book entries on the computer server for the delivered ordinary shares of the business entity and storing corresponding records of the book entries in the database.

In one embodiment, said at least one computer server is further programmed for retaining $\{e_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating the earning growth, $\Delta e_i$, for the ith first predetermined time period $t_1$ from the immediate prior year, the (i−1)th year, by the following formula:

$$\Delta e_i = e_i - e_{i-1};$$

calculating by the computer server a function $n^i_{rs}(\Delta e_i, SP_i)$ that satisfies the following conditions:

$$\partial N^i_{rs}(\Delta e_i, SP_i)/\partial \Delta e_i \geq 0, \text{ and}$$

$$\partial N^i_{rs}(\Delta e_i, SP_i)/\partial SP_i \leq 0,$$

wherein $SP_i$ is the market stock price per share for the ordinary shares of the business entity averaged over a predetermined time period of the ith first predetermined time period $t_1$;

calculating by the computer server, $n^i_{rs}$, the total number of ordinary shares of the business entity converted for the ith first predetermined time period $t_1$ for the seller company from the following relationship:

$$n^i_{rs} = \text{Min}(n^i_{rs}(\Delta e_i, SP_i), \Sigma^i_{k=1} n^k_{cs} \times \alpha_{i+1-k}); \text{ and}$$

when $n^i_{rs}$ ordinary shares of the business entity for the ith first predetermined time period $t_1$ are delivered to the seller company, making book entries on the computer server for the delivered $n^i_{rs}$ ordinary shares of the business entity and storing corresponding records of the book entries in the database.

In one embodiment, $n^i_{rs}(\Delta e_i, SP_i)$ is in the form of $$n^i_{rs}(\Delta e_i, SP_i) = C_0[\Sigma^i_{k=1} \Delta e_k/SP_i],$$

wherein $C_0$ is a predetermined constant. The number $n^i_{rs}$ of convertible preference shares that is converted and delivered to the seller company for the ith first predetermined time period $t_1$ is determined by the following relationship:

$$n^i_{rs} = \text{Min}(C_0[\Sigma^i_{k=1} \Delta e_k/SP_i], \Sigma^i_{k=1} n^k_{cs} \times \alpha_{i+1-k}).$$

The first predetermined time period $t_1$ is one of a year, a fiscal year, a half year, a half fiscal year, a quarter, a fiscal quarter, a month, and a fiscal month.

The present invention, in a further aspect, relates to a computer-readable medium storing instructions which, when executed by a processor, cause an internet accessible computer system to perform a method for conducting business to business operations between a buyer company and a seller company.

In one embodiment, the method comprises the steps of:

registering a seller company with the internet accessible computer system;

registering a buyer company with the internet accessible computer system, wherein the seller company sells goods to the buyer company, and the buyer company makes payment to the seller company, and wherein the registration of the buyer company depends on the registration of the seller company;

when a business entity in control of the internet accessible computer system issues, at the beginning of a first predetermined time period $t_1$, time $T_0$, a number $n_{cs}$ of convertible preference shares to the seller company, wherein the $n_{cs}$ convertible shares are convertible to $n_{rs}$ ordinary shares of the business entity over a period of time T counting from time $T_0$, calculating the number $n_{cs}$ according to the following formula:

$$n_{cs} = (pae \times L)/SP_0,$$

wherein the ordinary shares of the business entity are publicly traded in a capital market, the period of time T is divided into a predetermined number L of the first predetermined time period $t_1$ such that $T = L \times t_1$, pae is the projected annual after-tax earning that the seller company would make from the sales of the goods to the buyer company over the period of time T, and $SP_0$ is the stock price per share for the ordinary shares of the business entity averaged over a second predetermined time period $t_2$ around time $T_0$;

when cash or cash equivalents payments are received by the business entity from the buyer company, wherein the cash or cash equivalents payment are made by the buyer company for goods sold by the seller company to the buyer company, making book entries on the computer server for all the cash or cash equivalents payments received and storing corresponding records of the book entries in the database;

aggregating in every first predetermined time period $t_1$ over the period of time T by the computer server all the cash or cash equivalents payments received from the buyer company into a first amount, $\{m_{1i}, i=1, \ldots, L\}$;

calculating $e_i$, the after-tax earning that the seller company would make from the sales of the goods to the buyer company over the ith first predetermined time period $t_1$;

when cash or cash equivalents payments are made by the business entity to the seller company, aggregating all the cash or cash equivalents made in a second amount, $\{m_{2i},$ i=1, ..., L}, in every first predetermined time period $t_1$ over the period of time T, wherein $m_{1i}$ and $m_{2i}$ satisfy the following relationships:

$$m_{2i} < m_{1i}, \text{ and}$$

$$(m_{1i} - m_{2i}) \times (1 - R_{tax}) = e_i;$$

making book entries on the computer server for all the cash or cash equivalents payments made and storing corresponding records of the book entries in the database;

calculating a maximum number $n_{rs}$, which is determined by the following formula:

$$n_{rs} = \Sigma_{i=1}^{L} n_{cs}^{i} \times \alpha_i,$$

where $\{\alpha_i\}$ satisfy the condition of $\Sigma_{i=1}^{L} \alpha_i \leq 1$, and the number of $n_{cs}$ convertible preference shares issued to the seller company converted to a number of ordinary shares of the business entity over the period of time T is no greater than the maximum number $n_{rs}$; and when a number of ordinary shares of the business entity is delivered to the plurality of seller companies, making book entries on the computer server for the delivered ordinary shares of the business entity and storing corresponding records of the book entries in the database.

In one embodiment, the method further comprises the steps of:

retaining $\{e_i, i=1, \ldots, L\}$ as the cash flow for the business entity to back the ordinary shares of the business entity publicly traded in the capital market;

making book entries on the computer server for all the cash flow retained and storing corresponding records of the book entries in the database;

calculating the earning growth, $\Delta e_i$, for the ith first predetermined time period $t_1$ from the immediate prior year, the (i−1)th first predetermined time period $t_1$, by the following formula:

$$\Delta e_i = e_i - e_{i-1};$$

calculating by the computer server a function $n_{rs}^{i}(\Delta e_i, SP_i)$ that satisfies the following conditions:

$$\partial n_{rs}^{i}(\Delta e_i, SP_i)/\partial \Delta e_i \geq 0, \text{ and}$$

$$\partial n_{rs}^{i}(\Delta e_i, SP_i)/\partial SP_i \leq 0,$$

wherein $SP_i$ is the market stock price per share for the ordinary shares of the business entity averaged over a predetermined time period around time of the ith first predetermined time period $t_1$;

calculating by the computer server, $n_{rs}^{i}$, the total number of ordinary shares of the business entity converted at the ith first predetermined time period $t_1$ for the seller company from the following relationship:

$$n_{rs}^{i} = \text{Min}(n_{rs}^{i}(\Delta e_i, SP_i), \Sigma_{k=1}^{i} n_{cs}^{k}(k) \times \alpha_{i+1-k}); \text{ and}$$

when $n_{rs}^{i}$ ordinary shares of the business entity at the ith first predetermined time period $t_1$ are delivered to the seller company, making book entries on the computer server for the delivered $n_{rs}^{i}$ ordinary shares of the business entity and storing corresponding records of the book entries in the database.

In one embodiment, $n_{rs}^{i}(\Delta e_i, SP_i)$ is in the form of $$n_{rs}^{i}(\Delta e_i, SP_i) = C_0[\Sigma_{k=1}^{i} \Delta e_k / SP_i],$$

wherein $C_0$ is a predetermined constant. The number $n_{rs}^{i}$ of convertible preference shares that is converted and delivered to the seller company for the ith first predetermined time period $t_1$ is then determined by the following relationship:

$$n_{rs}^{i} = \text{Min}(C_0[\Sigma_{k=1}^{i} \Delta e_k / SP_i], \Sigma_{k=1}^{i} n_{cs}^{k}(k) \times \alpha_{i+1-k}).$$

The first predetermined time period $t_1$ is one of a year, a fiscal year, a half year, a half fiscal year, a quarter, a fiscal quarter, a month, and a fiscal month.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible.

Thus, the foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for using an internet accessible computer system to conduct business to business operations among a plurality of buyer companies and a plurality of seller companies, comprising the steps of:

(a) registering each of the plurality of seller companies with an internet accessible computer system, wherein each of the plurality of seller companies sells goods to a corresponding one of the plurality of buyer companies, and the corresponding one buyer company makes payment for the goods sold by that seller company;

(b) registering each of the plurality of buyer companies with the internet accessible computer system, wherein based on the registration request by a buyer company the computer system checks whether there is a corresponding seller company that exists for the buyer company, if there is no corresponding seller company that exists for the buyer company, a notification of failing to register is generated and sent to the buyer company by the computer system, and if there is a corresponding seller company that exists for the buyer company, the computer system proceeds with registration of the buyer company;

(c) issuing by a business entity in control of the internet accessible computer system at the beginning of a first predetermined time period $t_1$, time $T_0$, a number $N_{cs}$ of convertible preference shares to the plurality of seller companies, wherein the $N_{cs}$ convertible shares are convertible to $N_{rs}$ ordinary shares of the business entity over a period of time T counting from time $T_0$ according to the following formula:

$$N_{cs} = (PAE \times L)/SP_0,$$

wherein the ordinary shares of the business entity are publicly traded in a capital market, the period of time T is divided into a predetermined number L of the first predetermined time period $t_1$ such that $T = L \times t_1$, PAE is the projected annual after-tax earning that the plurality of seller companies would make from the sales of the goods to the plurality of buyer companies over the period of time T, and $SP_0$ is the stock price per share for the ordinary shares of the business entity averaged over a second predetermined time period $t_2$ around time $T_0$;

(d) receiving cash or cash equivalents payments by the business entity from the plurality of buyer companies, wherein the cash or cash equivalents payment are made by the plurality of buyer companies for goods sold by the plurality of corresponding seller companies to the plurality of buyer companies, respectively;

(e) aggregating in every first predetermined time period $t_1$ over the period of time T by a computer server all the cash or cash equivalents payments received from the plurality of buyer companies into a first amount, $\{M_{1i}, i=1, \ldots, L\}$;

(f) making cash or cash equivalents payments by the business entity to the plurality of seller companies aggregated in a second amount, $\{M_{2i}, i=1, \ldots, L\}$, in every first predetermined time period $t_1$ over the period of time T, wherein $M_{1i}$ and $M_{2i}$ satisfy the following relationships:

$$M_{2i} < M_{1i}, \text{ and}$$

$$(M_{1i} - M_{2i}) \times (1 - R_{tax}) = E_i,$$

wherein $E_i$ is the after-tax earning that the plurality of seller companies would make from the sales of the goods to the plurality of corresponding buyer companies over the ith first predetermined time period $t_1$; and (g) converting a number of $N_{cs}$ convertible preference shares issued to the plurality of seller companies to a number of ordinary shares of the business entity over the period of time T no greater than a maximum number $N_{rs}$, which is determined by the following formula:

$$N_{rs} = \Sigma^L_{i=1} N_{cs}(i) \times \alpha_i,$$

where $\{\alpha_i\}$ satisfy the condition of $\Sigma^L_{i=1} \alpha_i \leq 1$;

(h) calculating by the computer server the earning growth, $\Delta E_i$, of the ith first predetermined time period $t_1$ from the immediate first predetermined time period $t_1$, the (i−1)th first predetermined time period $t_1$, by the following formula:

$$\Delta E_i = E_i - E_{i-1}; \text{ and}$$

(i) completing the issuance and delivery of $N^i_{rs}$ ordinary shares of the business entity at the ith first predetermined time period $t_1$ to the plurality of seller companies according to a function $N^i_{rs}(\Delta E_i, SP_i)$ that satisfies the following conditions:

$$\partial N^i_{rs}(\Delta E_i, SP_i)/\partial \Delta E_i \geq 0, \text{ and}$$

$$\partial N^i_{rs}(\Delta E_i, SP_i)/\partial SP_i \leq 0,$$

wherein $SP_i$ is the market stock price per share for the ordinary shares of the business entity averaged over a predetermined time period around time of the ith first predetermined time period $t_1$, and $N^i_{rs}$ is the total number of ordinary shares of the business entity converted at the ith first predetermined time period $t_1$ by the plurality of seller companies;

wherein $N^i_{rs}(\Delta E_i, SP_i)$ is in the form of $$N^i_{rs}(\Delta E_i, SP_i) = C_0 [\Sigma^i_{k=1} \Delta E_k / SP_i],$$

wherein $C_0$ is a predetermined constant;

wherein the number $N^i_{rs}$ of convertible preference shares that is converted and delivered to the plurality of seller companies for the ith first predetermined time period $t_1$ is determined by the following relationship:

$$N^i_{rs} = \text{Min}(C_0[\Sigma^i_{k=1} \Delta E_k / SP_i], \Sigma^i_{k=1} N_{cs}(k) \times \alpha_{i+1-k}); \text{ and}$$

wherein the number $N^i_{rs}$ of convertible preference shares is delivered to the plurality of seller companies according to their contributions to the after-tax earnings $E_1, E_2, \ldots E_i$, respectively.

* * * * *